United States Patent
Hanaki et al.

(10) Patent No.: US 9,855,863 B2
(45) Date of Patent: Jan. 2, 2018

(54) LOCK DEVICE

(71) Applicant: MITSUI KINZOKU ACT CORPORATION, Yokohama-shi, Kanagawa (JP)

(72) Inventors: Naoki Hanaki, Kanagawa (JP); Naoya Seto, Kanagawa (JP)

(73) Assignee: MITSUI KINZOKU ACT CORPORATION, Yokohama-shi (JP)

( * ) Notice: Subject to any disclaimer, the term of this patent is extended or adjusted under 35 U.S.C. 154(b) by 451 days.

(21) Appl. No.: 13/758,278

(22) Filed: Feb. 4, 2013

(65) Prior Publication Data

US 2013/0259565 A1    Oct. 3, 2013

(30) Foreign Application Priority Data

Mar. 30, 2012  (JP) ................................ 2012-081298

(51) Int. Cl.
| | |
|---|---|
| *B60N 2/02* | (2006.01) |
| *B60N 2/015* | (2006.01) |
| *B60N 2/22* | (2006.01) |
| *B60N 2/36* | (2006.01) |

(52) U.S. Cl.
CPC ..... *B60N 2/01516* (2013.01); *B60N 2/01583* (2013.01); *B60N 2/2245* (2013.01); *B60N 2/36* (2013.01); *Y10T 403/7075* (2015.01)

(58) Field of Classification Search
CPC .......... E05B 79/00; E05B 79/02; E05B 79/04; B60N 2/2245; B60N 2/01516; B60N 2/01583; B60N 2/36

USPC ....... 292/201, 216, 341.15–341.19, DIG. 23, 292/DIG. 60, 337, DIG. 53, 194, DIG. 14; 297/378.12, 378.13; 296/65.09, 65.16, 296/65.17, 65.01
See application file for complete search history.

(56) References Cited

U.S. PATENT DOCUMENTS

| | | | | |
|---|---|---|---|---|
| 3,081,117 | A | * | 3/1963 | McDaniel ..................... 292/216 |
| 3,239,260 | A | * | 3/1966 | Beckman et al. .............. 292/11 |
| 3,630,557 | A | * | 12/1971 | Pierce et al. ..................... 292/45 |
| 4,643,470 | A | * | 2/1987 | Kazuyuki ............... E05B 83/16 292/216 |
| 4,756,563 | A | * | 7/1988 | Garwood et al. ............. 292/216 |

(Continued)

FOREIGN PATENT DOCUMENTS

| | | | |
|---|---|---|---|
| EP | 894923 | A1 * | 2/1999 |
| EP | 1039079 | A1 * | 9/2000 |

(Continued)

*Primary Examiner* — Alyson M Merlino
(74) *Attorney, Agent, or Firm* — Foley & Lardner LLP

(57) ABSTRACT

A lock device includes: a body having a striker insertion groove into which a striker is inserted; a hook lever shaft mounted to the body; and a hook lever rotatably mounted to the body via the hook lever shaft, and that moves to an engagement position where the hook lever is engaged with the striker inserted into the striker insertion groove, and that moves to a release position where the engagement with the striker is released. The lock device is rotatably supported by a support member so as to change an opening position of the striker insertion groove. The hook lever shaft is rotatably mounted to the body, and has a flange interposed between the body and the support member, and the body is supported by the support member so as to rotate about the hook lever shaft as a rotation shaft.

4 Claims, 20 Drawing Sheets

(56) References Cited

U.S. PATENT DOCUMENTS

| | | | |
|---|---|---|---|
| 6,152,500 A * | 11/2000 | Kowalewski et al. | 292/216 |
| 7,246,840 B2 * | 7/2007 | Gates et al. | 296/106 |
| 8,894,107 B2 * | 11/2014 | Kamata et al. | 292/216 |
| 9,073,452 B2 * | 7/2015 | Kamata | B60N 2/01516 |
| 9,376,038 B2 * | 6/2016 | Seto | B60N 2/366 |
| 2014/0117698 A1 * | 5/2014 | Seto | B60N 2/01583 |
| | | | 296/65.03 |
| 2014/0169873 A1 * | 6/2014 | Kamata | B60N 2/01583 |
| | | | 403/384 |
| 2015/0028618 A1 * | 1/2015 | Seto et al. | 296/65.09 |

FOREIGN PATENT DOCUMENTS

| | | | |
|---|---|---|---|
| JP | 10-324182 A | | 12/1998 |
| JP | 11-123971 A | | 5/1999 |
| WO | WO 2012173084 A1 | * | 12/2012 |
| WO | WO 2013/021679 A1 | | 2/2013 |

* cited by examiner

WIDTHWISE DIRECTION

LOCK DEVICE

CROSS-REFERENCE TO RELATED APPLICATIONS

The present application claims priority to and incorporates by reference the entire contents of Japanese Patent Application No. 2012-081298 filed in Japan on Mar. 30, 2012.

BACKGROUND OF THE INVENTION

1. Field of the Invention

The present invention relates to a lock device used for fixing a detachable seat or a movable seat.

2. Description of the Related Art

Some vehicles such as minivans and buses include a detachable seat or a movable seat (hereinafter collectively referred to as "detachable seat"). The detachable seat is fixed to a vehicle body in such a manner that a lock device provided to the seat or the vehicle body restrains a striker mounted to the other one of the seat and the vehicle body.

The lock device for fixing the detachable seat to the vehicle body includes a lock mechanism having a hook lever or an open lever, and a lock mechanism housing member for housing the lock mechanism. The lock mechanism housing member includes a body having substantially a concave shape, and a cover plate covering an opening of the body. The lock mechanism housing member has a striker insertion groove into which the striker is inserted upon fixing the seat. The lock mechanism is configured such that the hook lever is engaged with the striker inserted into the striker insertion groove, and then, the striker is restrained by the most inward part of the striker insertion groove and the hook lever.

The lock device is fastened and fixed to a support member such as a frame of the detachable seat by use of a support bolt. However, when the lock device is fixed to the frame (support member), the striker may not be engaged with the hook lever due to the deviation (mounting error) caused on the mounting position of the lock device or the striker, resulting in that the detachable seat may not be fixed to the vehicle body. As one of countermeasures for solving this problem, a method of mounting the lock device to the frame so as to be rotatable or swingable has been proposed.

When the lock device is mounted to the frame so as to be rotatable or swingable, the mounting portion to the frame is formed to project from the outer surface of the lock mechanism housing member, and a circular hole and an arc-like elongated hole about the circular hole are formed on the mounting portion (e.g., see Japanese Unexamined Patent Publication No. 10-324182). The lock mechanism housing member is mounted to the frame by use of the support bolt and a nut through the circular hole and the elongated hole. In this mounting method, the lock mechanism housing member (lock device) can swing about the circular hole. Therefore, even if the mounting position of the striker is shifted, for example, the lock device swings, so that the hook lever is engaged with the striker. Thus, the detachable seat can be fixed to the vehicle body.

The vehicle body and the detachable seat have variety of shapes, so that the environment of the portion where the lock device is mounted is different depending upon a type of vehicle. Therefore, considering versatility, the lock device for fixing the detachable seat to the vehicle body is desirably compact, and desirably has a lot of flexibility in the mounting position. However, the above-mentioned lock device having the mounting portion projecting from the outer surface of the lock mechanism housing member is large-sized as a whole.

When the above-mentioned lock device having the mounting portion is mounted to the frame so as to be rotatable or swingable, the rotation is inhibited by friction resistance generated on a contact surface between the mounting portion and the frame during the rotation of the lock device, which might cause incomplete engagement en the striker and the hook lever.

The present invention is accomplished in view of the above-mentioned circumstance, and aims to provide a lock device that can realize an accurate engagement between a striker and a hook lever without an increase in size of the device.

SUMMARY OF THE INVENTION

It is an object of the present invention to at least partially solve the problems in the conventional technology.

According to an aspect of the present invention, a lock device includes: a body having a striker insertion groove into which a striker is inserted; a hook lever shaft mounted to the body; and a hook lever rotatably mounted to the body via the hook lever shaft, and that moves to an engagement position where the hook lever is engaged with the striker inserted into the striker insertion groove, and that moves to a release position where the engagement with the striker is released, and the lock device is rotatably supported by a support member so as to change an opening position of the striker insertion groove, and the hook lever shaft is rotatably mounted to the body, and has a flange interposed between the body and the support member, and the body is supported by the support member so as to rotate about the hook lever shaft as a rotation shaft.

According to another aspect of the present invention, a lock device includes: a body having a striker insertion groove into which a striker is inserted; a hook lever shaft mounted to the body; and a hook lever rotatably mounted to the body via the hook lever shaft, and that moves to an engagement position where the hook lever is engaged with the striker inserted into the striker insertion groove, and to a release position where the engagement with the striker is released, the lock device being rotatably supported to a support member so as to change an opening position of the striker insertion groove, and the hook lever shaft is rotatably mounted to the body, one of the lock device and the support member has a projection that projects toward the other one of the lock device and the support member, causes the lock device and the support member to abut each other around the hook lever shaft, and forms a predetermined gap between the body and the support member, and the body is supported by the support member so as to rotate about the hook lever shaft as a rotation shaft.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
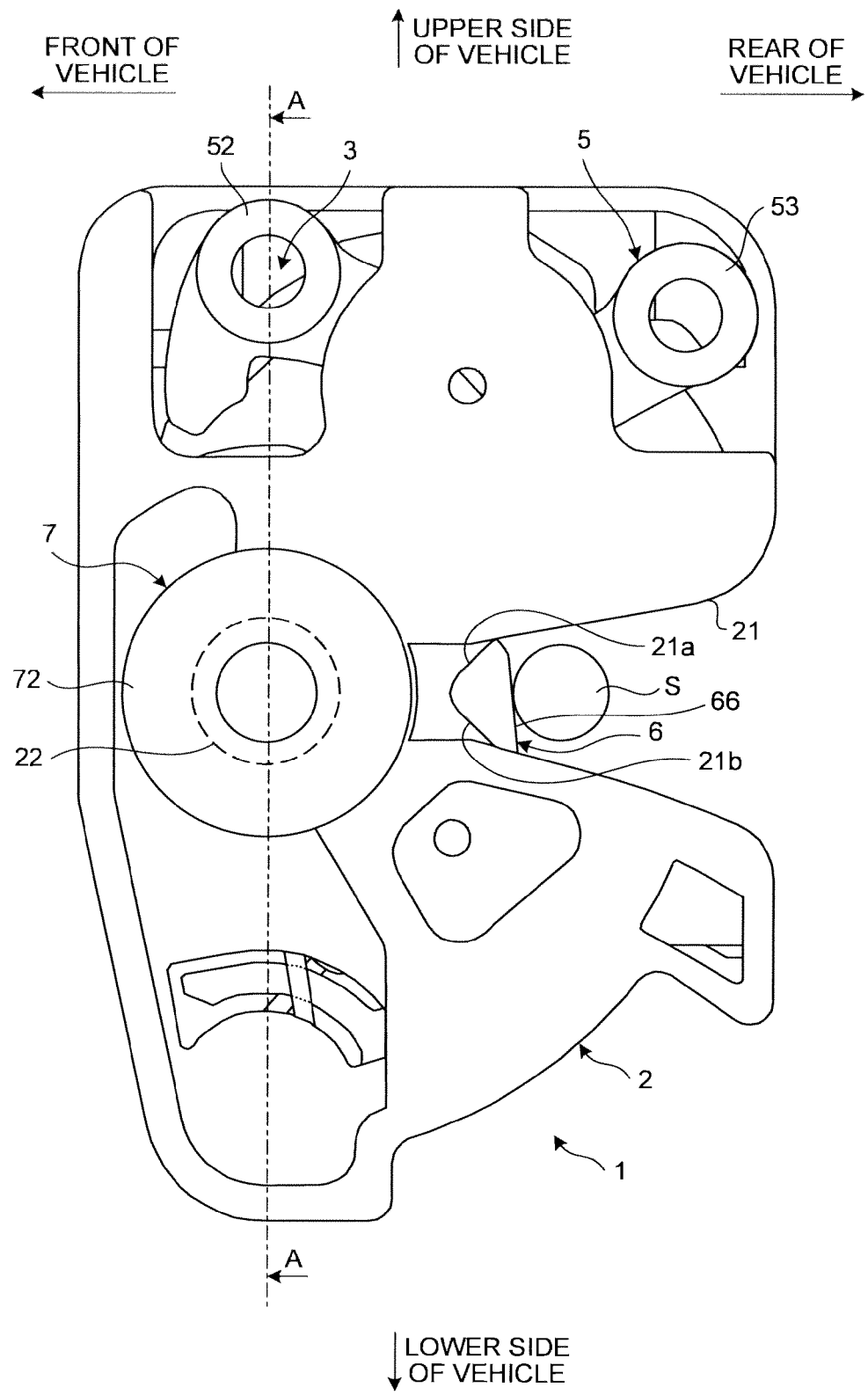
FIG. 1 is a plan view illustrating a schematic configuration of a lock device according to a first embodiment of the present invention.

Embodiments a lock device according to the present invention will be described in detail below with reference to the accompanying drawings. Parts having the same functions are designated by the same reference numerals in all drawings for describing the embodiments, and description thereof will not be repeated.

First Embodiment

Figure 2:
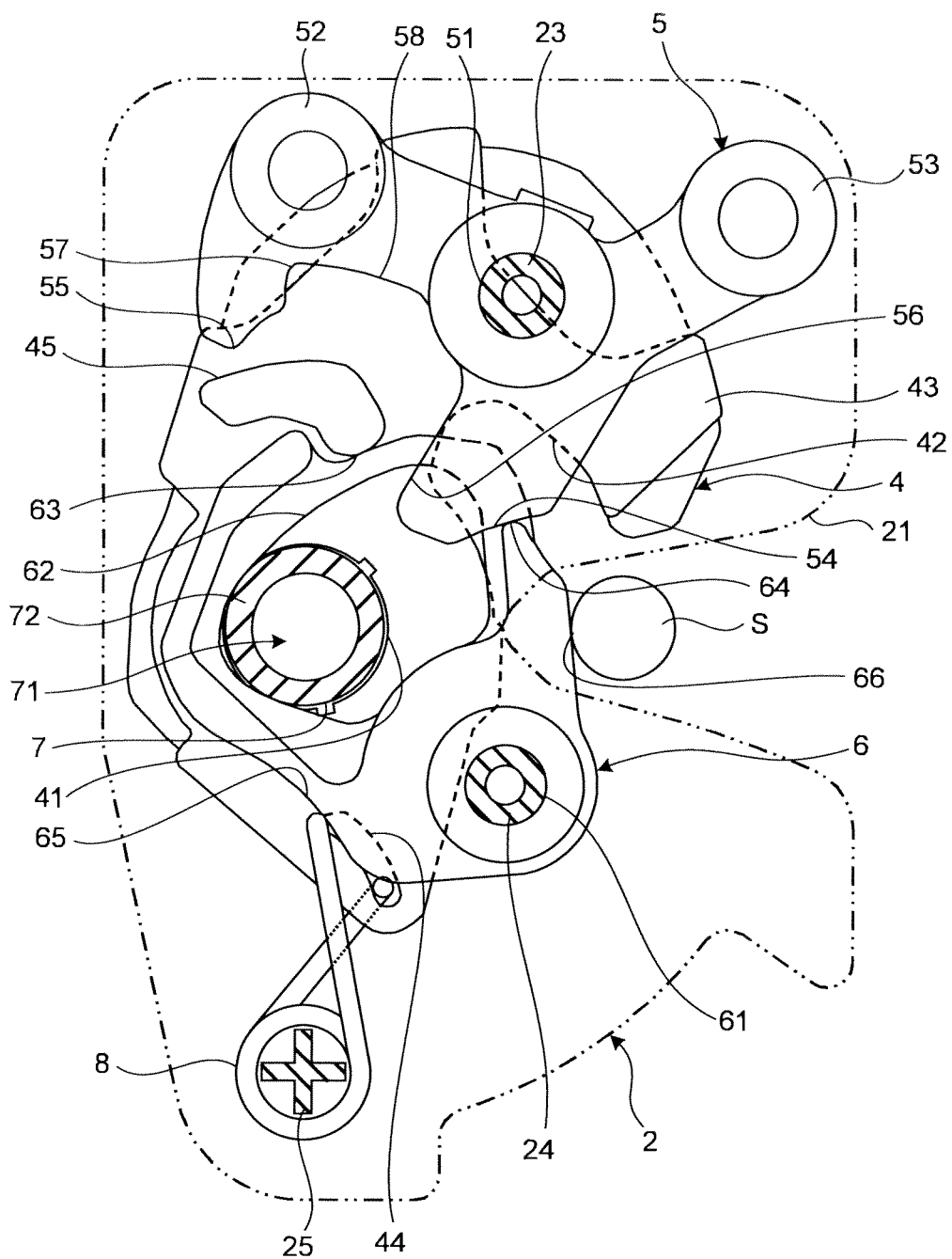
FIG. 2 is a view illustrating an internal structure of the lock device in FIG. 1.
Figure 3:
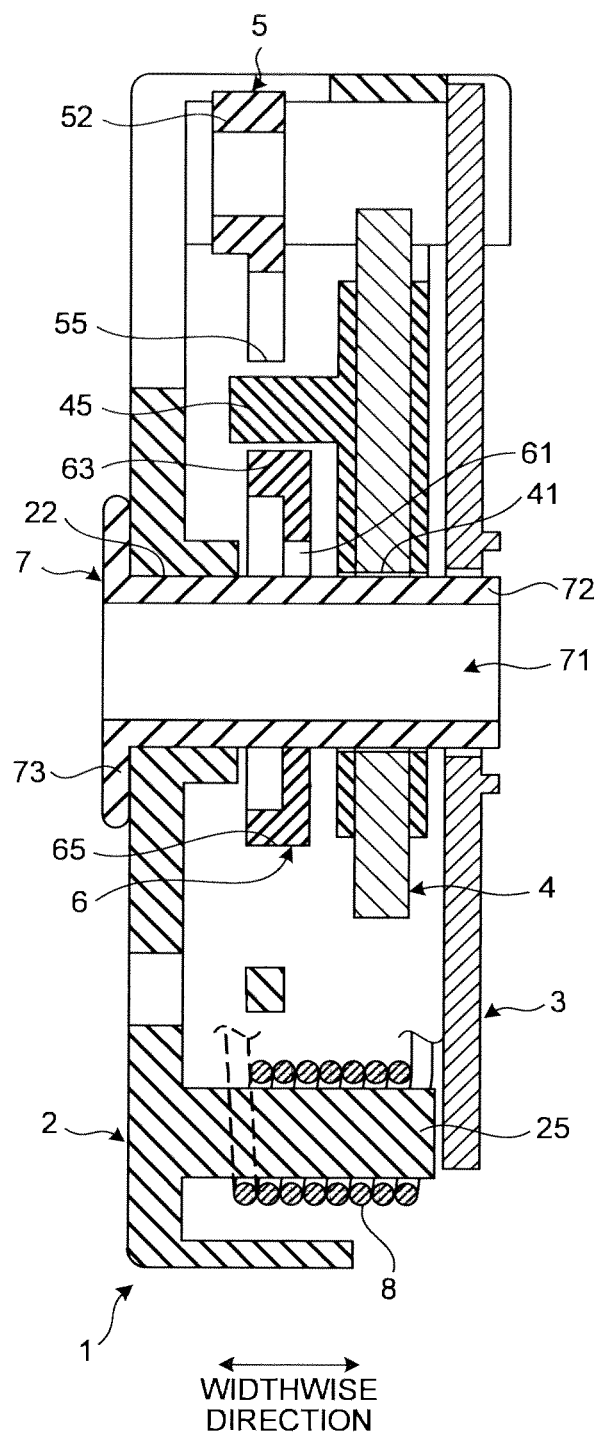
FIG. 3 is a sectional view taken along a line A-A in FIG. 1.

FIG. 1 is a plan view illustrating a schematic configuration of a lock device according to a first embodiment of the present invention. FIG. 2 is a view illustrating an internal structure of the lock device in FIG. 1. FIG. 3 is a sectional view taken along a line A-A in FIG. 1.

The lock device according to the first embodiment is used to fix a detachable seat to a vehicle body, and rotatably supported with a frame (support member) of a backrest of the detachable seat. A lock device 1 includes a body 2, and a cover plate 3 that is mounted to be overlapped with the body 2 as illustrated in FIGS. 1 to 3. The body 2 and the cover plate 3 are a lock mechanism housing member that houses a lock mechanism which will be described later. A lock mechanism housing portion is formed between the body 2 and the cover plate 3. A lock mechanism including a hook lever 4, an open lever 5, a guide lever 6, and the like is housed in the lock mechanism housing portion.

The body 2 is a case having substantially a concave shape and made of synthetic resin, and has a striker insertion groove 21 formed on almost the center in the vertical direction of the vehicle in FIG. 1 so as to extend from an end at a rear of the vehicle toward a front of the vehicle. The cover plate 3 is a cover formed of a metal plate, and has a striker insertion groove (not illustrated) on almost the center in the vertical direction of the vehicle so as to extend from the end at the rear of the vehicle toward the front of the vehicle. The striker insertion groove 21 on the body 2 and the striker insertion groove on the cover plate 3 are formed to have a width so as to be capable of housing the striker S mounted to the vehicle body. The striker insertion groove 21 on the body 2 has, on its inmost part, substantially V-shaped (taper-shaped) locking surfaces 21a and 21b that are brought into contact with the inserted striker S on two points.

A mounting hole 22 for mounting a hook lever shaft 7, which supports the hook lever 4, to the body 2 so as to be rotatable is formed on the position in front of the striker insertion groove 21 on the body 2. An open lever shaft 23 that pivotally supports the open lever 5 is mounted above the striker insertion groove 21 on the body 2. A guide lever shaft 24 that pivotally supports the guide lever 6 is mounted below the striker insertion groove 21 on the body 2. A spring support member 25 for supporting a coil spring 8 that biases the hook lever 4 and the guide lever 6 is mounted on a position below the mounting hole 22 on the body 2.

The hook lever 4 is for engaging with the striker S provided to the vehicle body, and includes a shaft hole 41, an engagement surface 42, a hook portion 43, a spring mounting hole 44, and a lever abutting portion 45.

The shaft hole 41 is a hole for pivotally supporting the hook lever 4 with the hook lever shaft 7, and is formed to rotatably engage with the hook lever shaft 7. The engagement surface 42 is a surface that engages with the striker S inserted into the striker insertion groove 21, and is formed substantially an arc shape centering the shaft hole 41. The hook portion 43 prevents the striker S engaged with the engagement surface 42 from being released from the hook lever 4.

The spring mounting hole 44 is a hole for mounting one end of the coil spring 8 supported by the spring support portion 25 of the body 2. The one end of the coil spring 8 mounted to the spring mounting hole 44 constantly exerts biasing force to the hook lever 4 in a clockwise direction shown in FIG. 2.

The lever abutting portion 45 is a portion that abuts with the open lever 5 and the guide lever 6, and is formed between the shaft hole 41 and the hook portion 43.

The open lever 5 is formed to release the engagement between the striker S and the hook lever 4. The open lever 5 includes: a shaft hole 51; a pull rod mounting portion 52; a push rod mounting portion 53; a first abutting portion 54; a second abutting portion 55; a third abutting portion 56; a fourth abutting portion 57; and a fifth abutting portion 58.

The shaft hole 51 a hole for pivotally supporting the open lever 5 with the open lever shaft 23, and is formed so as to rotatably engage with the open lever shaft 23. The pull rod mounting portion 52 is a portion for mounting a pull rod, the pull rod is for rotating the open lever 5 when releasing the engagement between the striker S and the hook lever 4. The push rod mounting portion 53 is a portion for mounting a push rod, the push rod is for rotating the open lever 5 when releasing the engagement between the striker S and the hook lever 4. Biasing force in the counterclockwise direction shown in FIG. 2 is constantly exerted on the open lever 5 by a not illustrated coil spring. The pull rod and the push rod are mounted so as to rotate the open lever 5 in the clockwise direction shown in FIG. 2 when the engagement between the striker S and the hook lever 4 is released.

The portions of the open lever 5 from the first abutting portion 54 to the fifth abutting portion 58 are portions that abut with the hook lever 4 or the guide lever 6.

The guide lever 6 is for moving the hook lever 4 to the engagement position from the release position when it is pressed by the striker S that is inserted into the striker insertion groove 21 and that moves to the inmost part of the groove. The guide lever 6 includes a shaft hole 61, a guide hole 62, a first abutting portion 63, a second abutting portion 64, a third abutting portion 65, and a fourth abutting portion 66.

The shaft hole 61 is a hole for pivotally supporting the guide lever 6 with the guide lever shaft 24, and is formed to rotatably engage with the guide lever shaft 24. The guide hole 62 is an elongated hole through which the hook lever shaft 7 is inserted. The guide hole 62 is formed such that the rotation range of the guide lever 6 about the guide lever shaft 24 becomes a predetermined rotation range.

The first abutting portion 63 and the second abutting portion 64 of the guide lever 6 are portions that abut with the hook lever 4 and the open lever 5. The third abutting portion 65 of the guide lever 6 is a portion that abuts (slidingly abuts) with the other end of the coil spring 8. The fourth abutting portion 66 of the guide lever 6 is a portion that abuts with the striker S.

The hook lever shaft 7 is for pivotally supporting the hook lever 4, and for rotatably supporting the body 2. The hook lever shaft 7 includes a cylindrical portion 72 having formed on its center a through-hole 71 into which a support bolt is inserted, wherein a flange 73 that is present between the body 2 and the frame is formed on one end of the cylindrical portion 72. The cylindrical portion 72 of the hook lever shaft 7 is inserted into the mounting hole 22 of the body 2 so as to be rotatable. The end (the other end) reverse to one end having the flange 73 of the cylindrical portion 72 of the hook lever shaft 7 is formed to have a length projecting from the opening of the cover plate 3 in order to be capable of supporting the body 2 to be rotatable with the support bolt being fastened to the frame.

Subsequently, the operation of the lock device 1 will briefly be described with reference to FIGS. 4 to 7.

Figure 4:
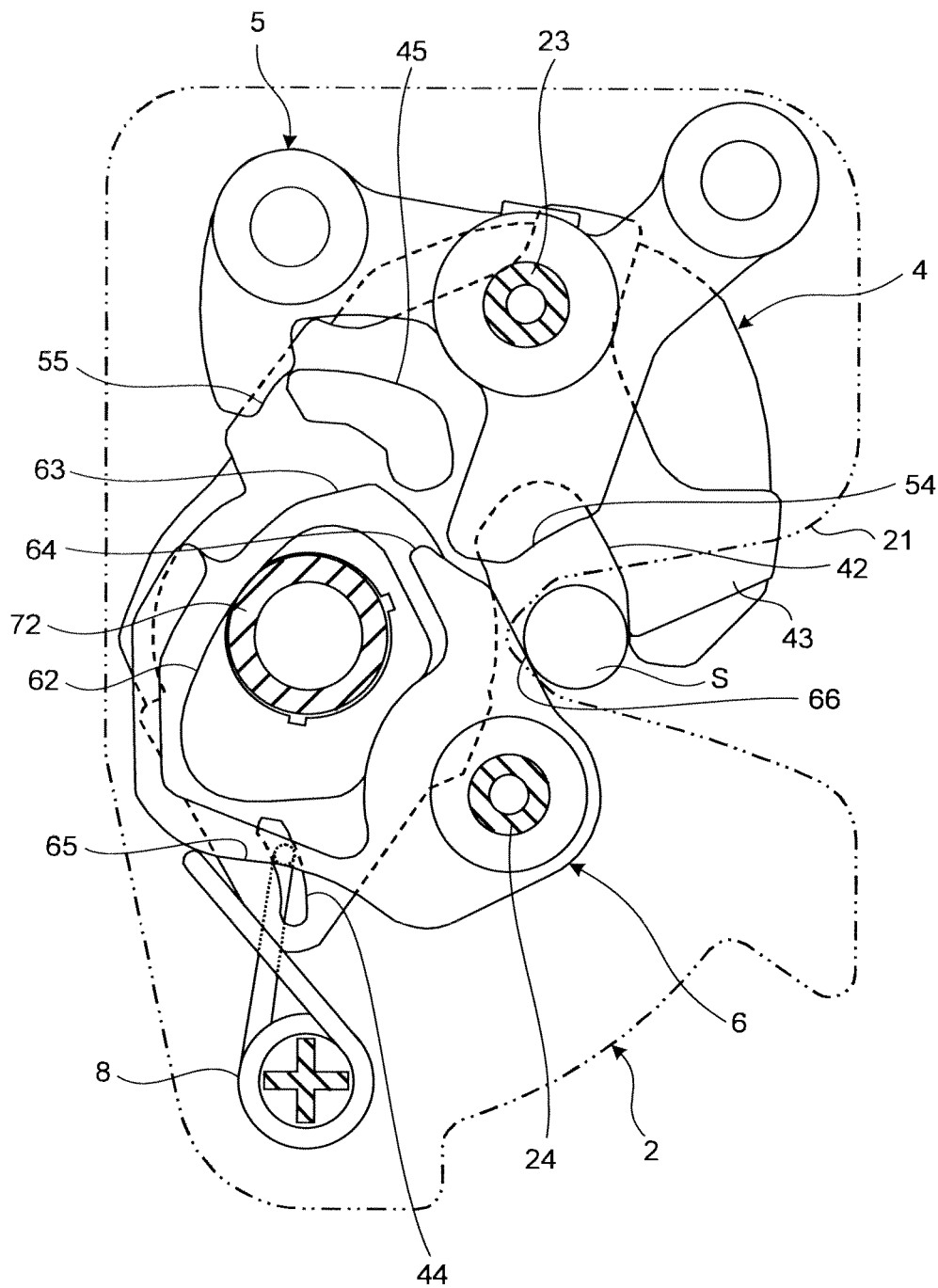
FIG. 4 is a view illustrating a relationship among a guide lever, a hook lever, and an open lever, just after a striker starts to press the guide lever.
Figure 5:
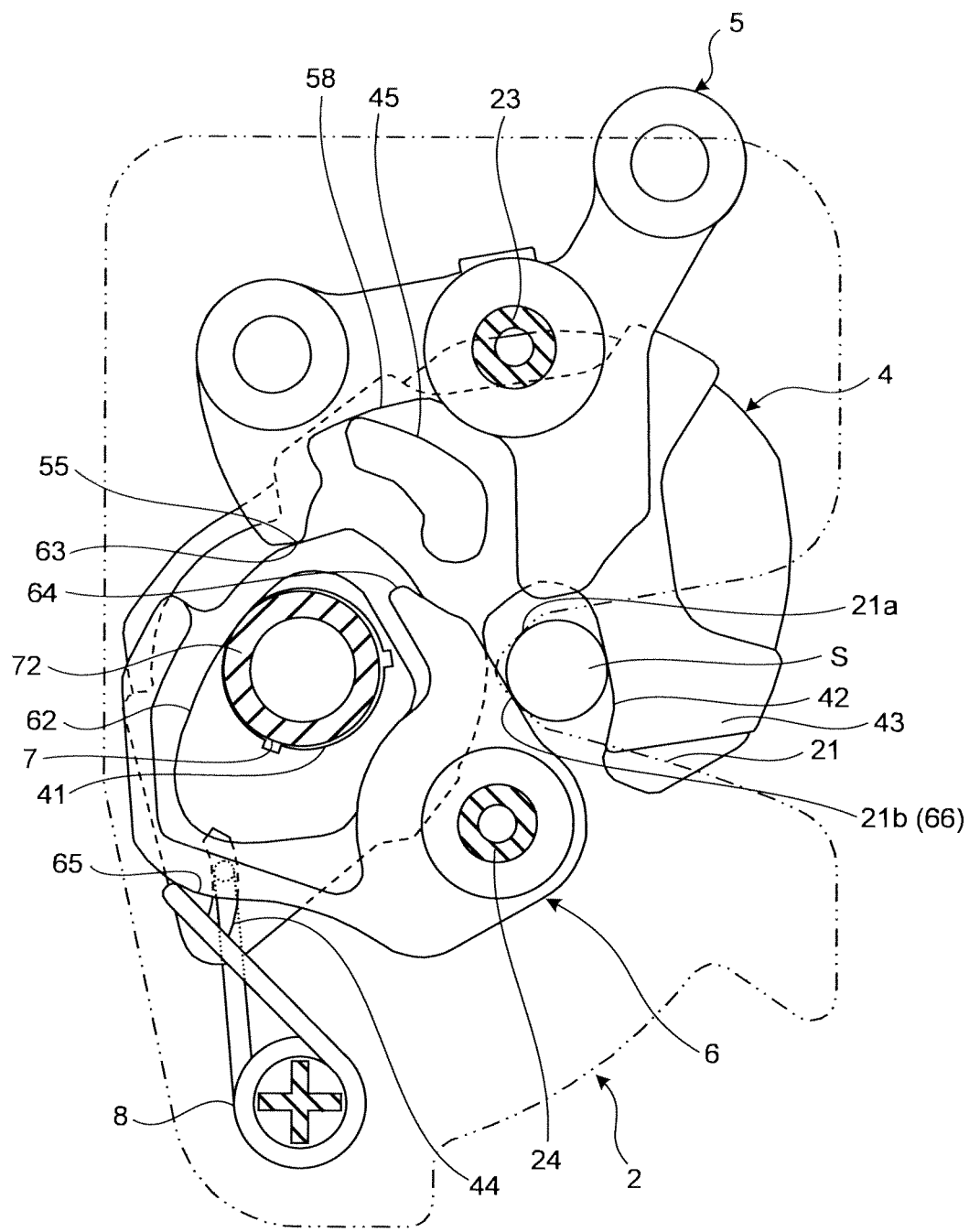
FIG. 5 is a view illustrating a relationship among the guide lever, the hook lever, and the open lever, when the striker is engaged with the hook lever.
Figure 6:
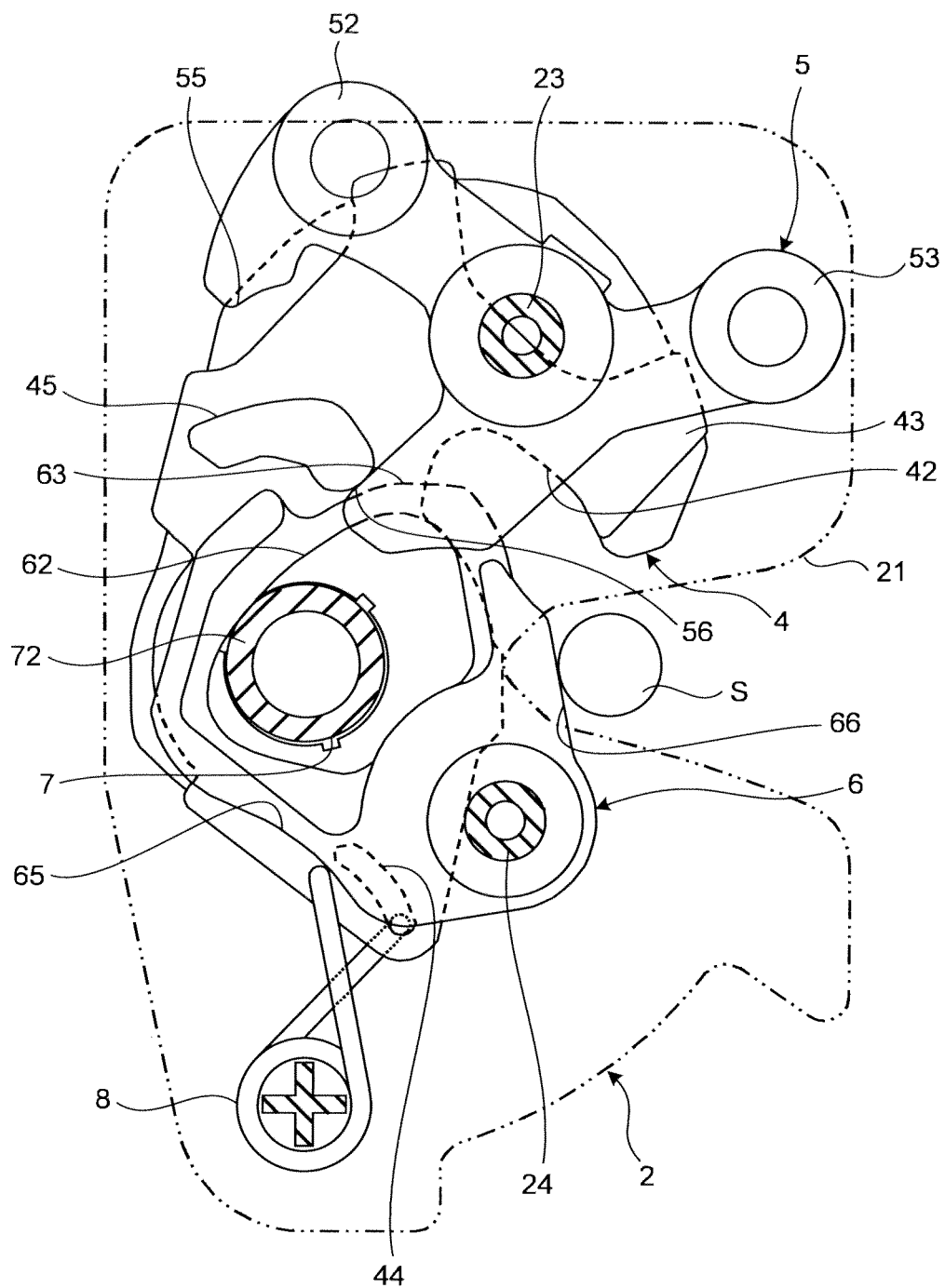
FIG. 6 is a view illustrating a relationship among the guide lever, the hook lever, and the open lever, when the open lever is rotated to release the engagement between the striker and the hook lever.
Figure 7:
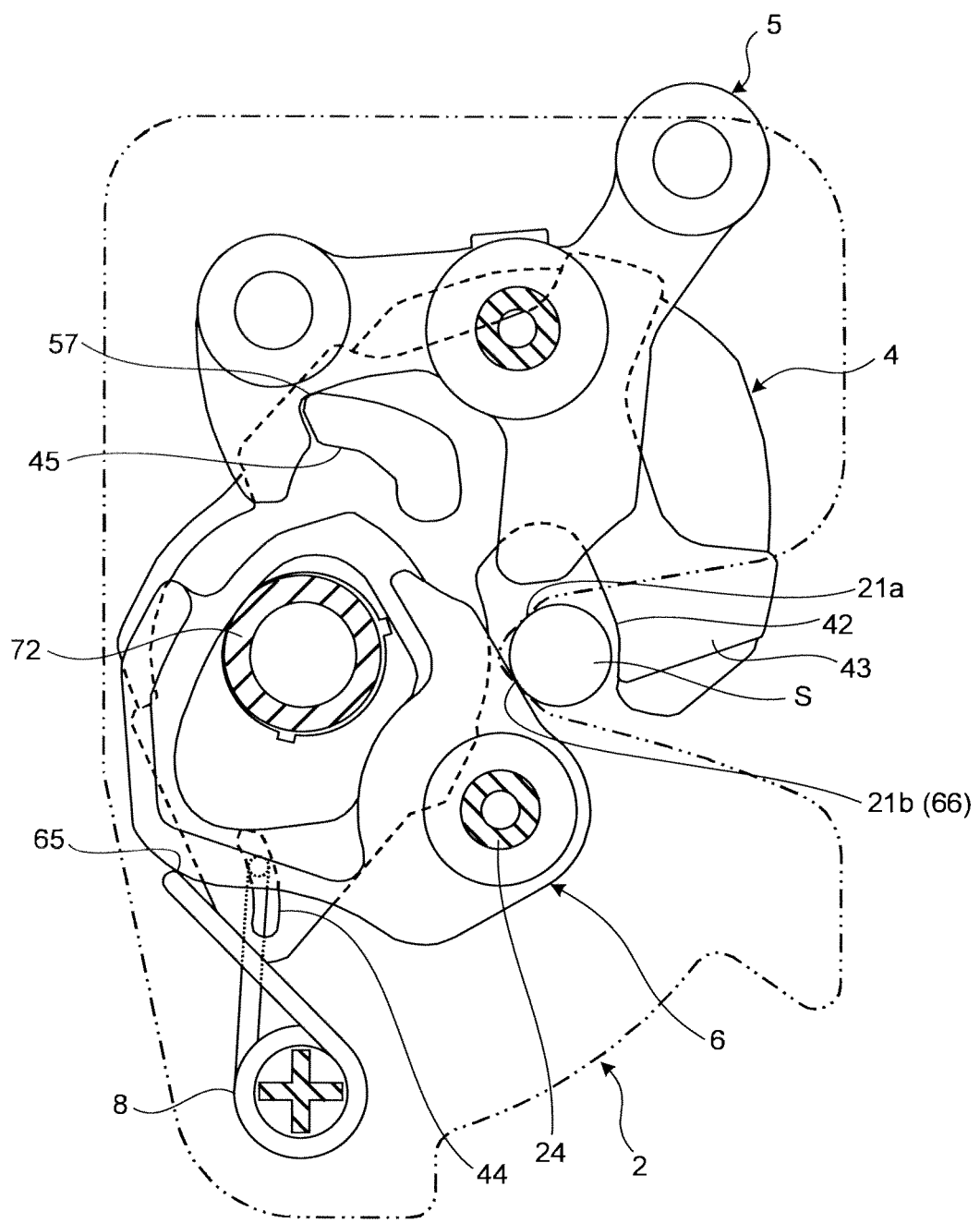
FIG. 7 is a view illustrating a relationship among the guide lever, the hook lever, and the open lever, when inertial release occurs on the hook lever.

FIG. 4 is a view illustrating a relationship among the guide lever, the hook lever, and the open lever, just after the striker starts to press the guide lever. FIG. 5 is a view illustrating a relationship among the guide lever, the hook lever, and the open lever, when the striker is engaged with the hook lever. FIG. 6 is a view illustrating a relationship among the guide lever, the hook lever, and the open lever, when the open lever is rotated to release the engagement between the striker and the hook lever. FIG. 7 is a view illustrating a relationship among the guide lever, the hook lever, and the open lever, when inertial release occurs on the hook lever.

The lock device 1 according to the first embodiment is mounted to the frame of the detachable seat as described above. In this case, the striker S is mounted to the vehicle body. When the detachable seat having the lock device 1 mounted thereto is fixed to the vehicle body, the detachable seat is moved toward the rear of the vehicle in FIG. 1 in order that the striker S is inserted into the striker insertion groove 21, and engaged with the hook lever 4.

The hook lever 4, the guide lever 6, and the open lever 5 in the unlocked state before the striker S is inserted into the striker insertion groove 21 have the positional relationship as illustrated in FIG. 2. The guide lever 6 tends to rotate in the clockwise direction shown in FIG. 2 due to the biasing force from the coil spring 8. However, the guide lever 6 is held on the position where the fourth abutting portion 66 crosses the striker insertion groove 21 by the engagement between the guide hole 62 and the hook lever shaft 7. The hook lever 4 tends to rotate in the clockwise direction in FIG. 2 by the biasing force from the coil spring 8. However, the hook lever 4 is held on the position (release position) where the lever abutting portion 45 abuts against the first abutting portion 63 of the guide lever 6 for restricting the rotation of the hook lever 4, and the hook portion 43 opens the striker insertion groove 21. The open lever 5 tends to rotate in the counterclockwise direction in FIG. 2 by the biasing force from the not illustrated coil spring. However, the open lever 5 is held on a predetermined rotation position as the rotation thereof is restricted because the first abutting portion 54 abuts with the second abutting portion 64 of the guide lever 6.

When the striker S is inserted into the striker insertion groove 21 of the lock device 1 in the unlocked state, the inserted striker S moves toward the inmost part of the striker insertion groove 21, and abuts against the fourth abutting portion 66 of the guide lever 6 as illustrated in FIG. 1. When the striker S moves further to the inmost part of the striker insertion groove 21, the guide lever 6 rotates in the counterclockwise direction by the press-contact from the striker S as illustrated in FIG. 4. When the guide lever 6 rotates in the counterclockwise direction, the abutment between the lever abutting portion 45 of the hook lever 4 and the first abutting portion 63 of the guide lever 6 is released. Therefore, the hook lever 4 rotates in the clockwise direction by the biasing force from the coil spring 8. As a result, the striker S and the engagement surface 42 of the hook lever 4 start to be engaged with each other. When the guide lever 6 rotates in the counterclockwise direction, the abutment between the first abutting portion 54 of the open lever 5 and the second abutting portion 64 of the guide lever 6 is released. Therefore, the open lever 5 rotates in the counterclockwise direction by the biasing force from the not illustrated coil spring.

When the hook lever 4 further rotates in the clockwise direction to reach the engagement position where the hook portion 43 crosses the striker insertion groove 21, the striker S is restrained by the engagement surface 42 of the hook lever 4 and the striker insertion groove 21 of the body 2, as illustrated in FIG. 5. On the other hand, the guide lever 6 tends to rotate in the clockwise direction by the biasing force from the coil spring 8. However, the rotation of the guide lever 6 is restricted due to the abutment between the fourth abutting portion 66 and the striker S, so that the guide lever 6 is held on this rotation position. The rotation of the open lever 5 that tends to rotate in the counterclockwise direction by the biasing force from the coil spring not illustrated is restricted by the abutment between the fifth abutting portion 58 and the lever abutting portion 45 of the hook lever 4, so that the open lever 5 is held on this rotation position.

In this case, if the open end (the leading end of the hook portion 43) on the engagement surface 42 of the hook lever 4 is formed to be arc shape centering the shaft hole 41, there is no chance that the hook lever 4 rotates in the direction (in the counterclockwise direction in FIG. 5) in which the engagement between the striker S and the engagement surface 42 is released, even if force for releasing the striker S (force in a direction toward the rear of the vehicle) is applied to the restrained striker S. If the hook portion 43 is formed to have a tapered shape in which the distance from the middle part of the engagement surface 42 to the inmost shaft hole 41 is gradually reduced toward the inmost part, the striker S is in contact with the engagement surface 42 on one point, so that a wedge effect can be attained. Therefore, when the inmost part of the striker insertion groove 21 formed on the body 2 has substantially V-shaped (tapershaped) locking surfaces 21a and 21b, the striker S is held on two points at the inmost part (locking surfaces 21a and 21b) of the striker insertion groove 21 and one point on the engagement surface 42, which can prevent rattle of the striker S. Accordingly, the generation of abnormal noise caused by the rattle of the striker S can be prevented, and the detachable seat can surely be fixed to the vehicle body.

When the hook portion 43 is formed to have a taper shape, the relative movement between the body 2 (the hook lever shaft 7) and the hook lever 4 is not caused when the striker S is restrained on two points of the locking surfaces 21a and 21b of the striker insertion groove 21 and one point of the engagement surface 42, even if a gap is formed between the shaft hole 41 of the hook lever 4 and the hook lever shaft 7. Therefore, even if the gap is formed between the shaft hole 41 of the hook lever 4 and the hook lever shaft 7, the generation of abnormal noise caused by the rattle between the hook lever 4 and the hook lever shaft 7 upon the restraint of the striker S can be prevented. In addition, the gap can be secured between the shaft hole 41 of the hook lever 4 and the hook lever shaft 7, so that the insertion property of the hook lever 4 can be enhanced.

When the detachable seat is released from the vehicle body, i.e., when the engagement between the striker S and the hook lever 4 (the engagement surface 42) is released, the open lever 5 is rotated in the clockwise direction by operating the push rod or the pull rod, as illustrated in FIG. 6. When the open lever 5 rotated in the clockwise on, the third abutting portion 56 abuts against the lever abutting portion 45 of the hook lever 4, and presses the same. Therefore, the hook lever 4 rotates in the counterclockwise direction, so that the striker S is released from the engagement surface 42 of the hook lever 4. Then, the guide lever 6 rotates in the clockwise direction to push out the striker S from the striker insertion groove 21. When the push rod or the pull rod is then returned, the open lever 5 rotates in the counterclockwise direction, whereby the open lever 5 is held on the rotation position where the first abutting portion 54 abuts against the second abutting portion 64 of the guide lever 6 as illustrated in FIG. 2. When the open lever 5 rotates in the counterclockwise direction, the press-contact to the lever abutting portion 45 from the third abutting portion 56 is canceled. Therefore, the hook lever 4 rotates in the clockwise direction, and is held on the position where the lever abutting portion 45 abuts against the first abutting portion 63 of the guide lever 6 as illustrated in FIG. 2.

In case where force for generating inertial release (release not caused by the operation of the open lever 5) is applied on the hook lever 4 when the detachable seat is fixed to the vehicle body, the lever abutting portion 45 of the hook lever 4 abuts against the fourth abutting portion 57 of the open lever 5 in the lock device 1 according to the first embodiment as illustrated in FIG. 7. Since the biasing force in the counterclockwise direction is exerted on the open lever 5, the lever abutting portion 45 of the hook lever 4 abuts against the fourth abutting portion 57 of the open lever 5, and is engaged with the same. With this structure, the rotation of the hook lever 4 in the counterclockwise direction can be inhibited. Accordingly, the lock device 1 according to the first embodiment can prevent the situation in which the fixation of the detachable seat to the vehicle body is inadvertently canceled.

Figure 8:
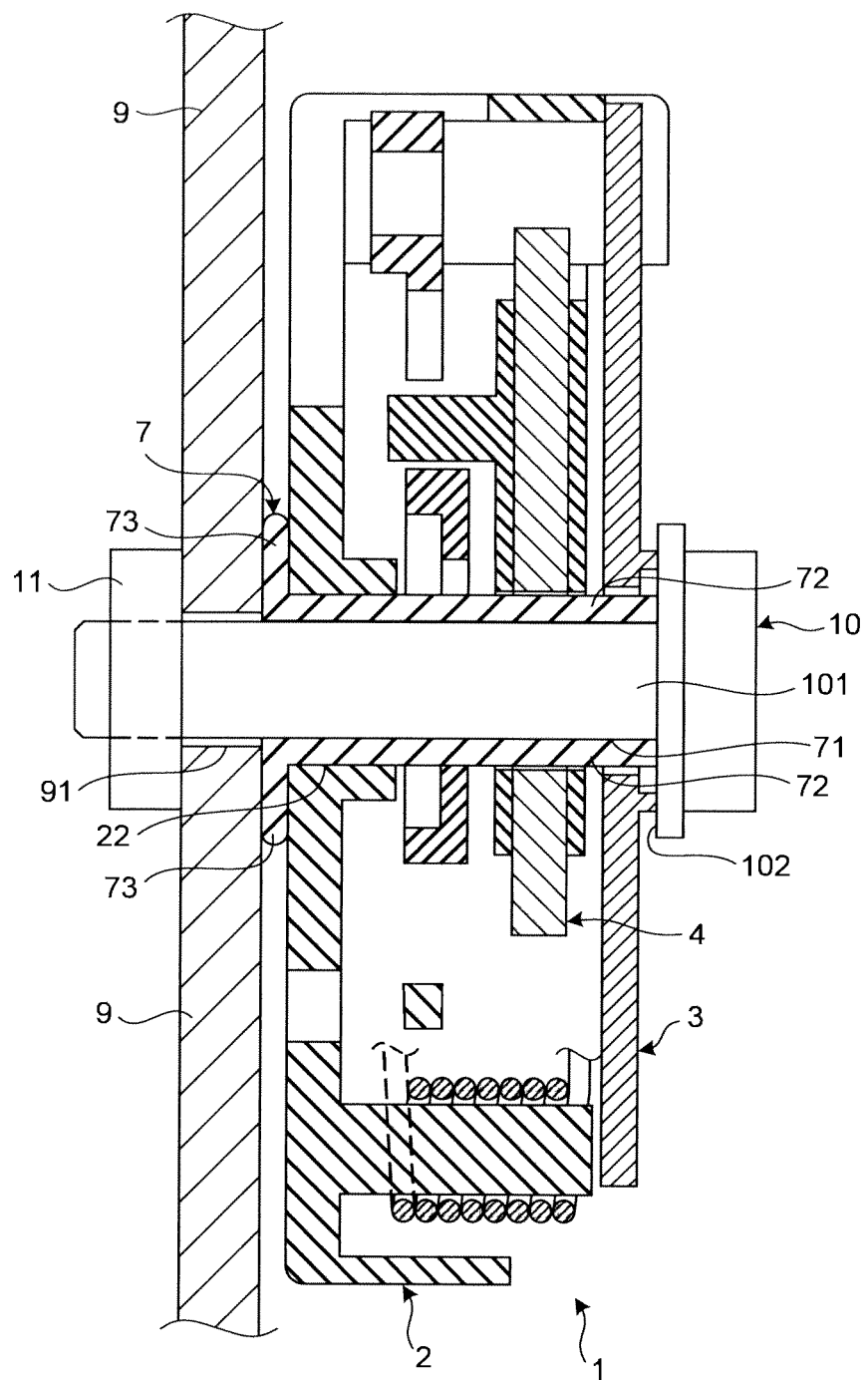
FIG. 8 is a sectional view illustrating a method of mounting the lock device according to the first embodiment of the present invention to a frame.
Figure 9:
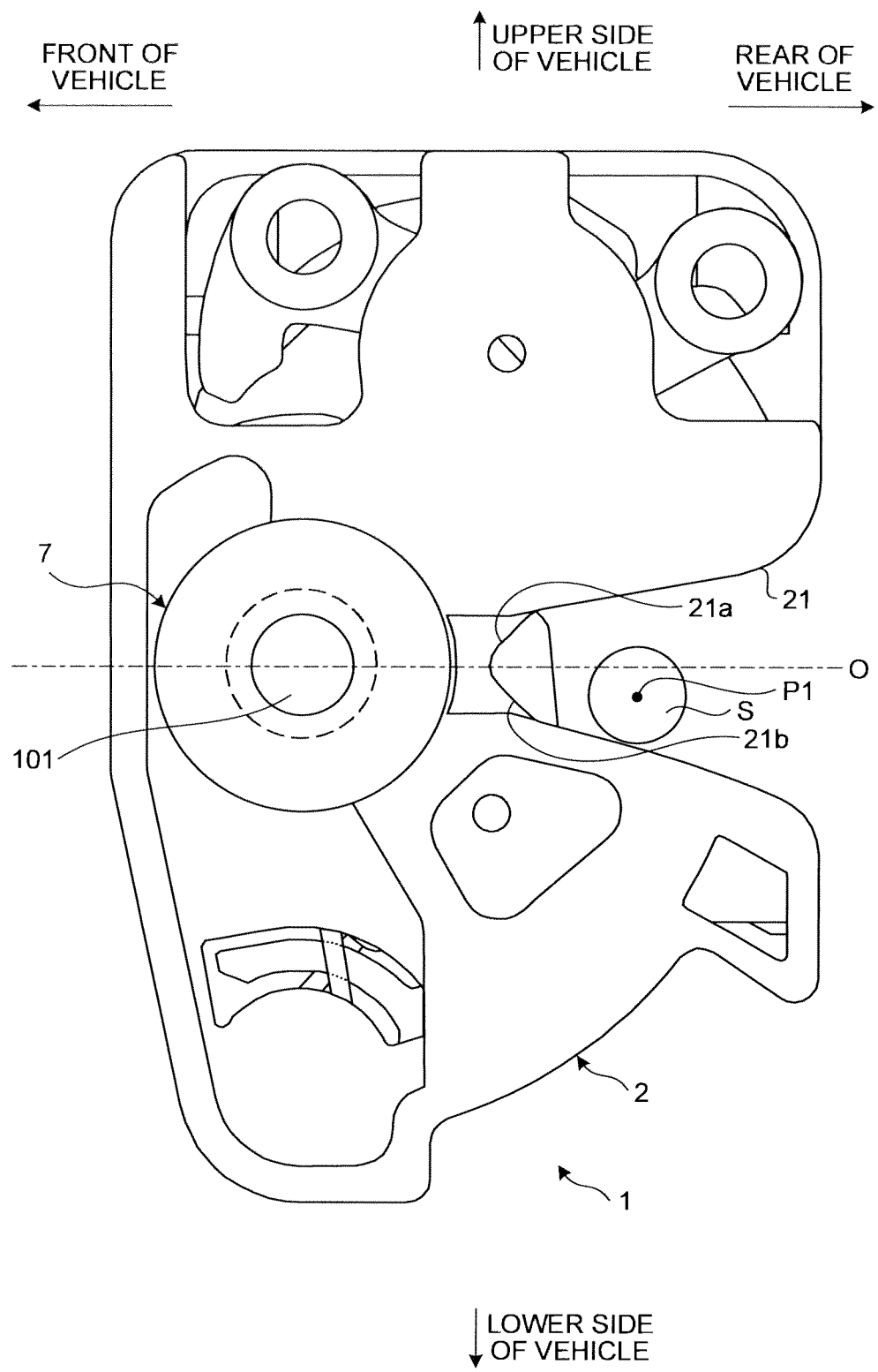
FIG. 9 is a plan view illustrating one example of a positional relationship between the lock device and the striker, when a mounting position of the striker is shifted.
Figure 10:
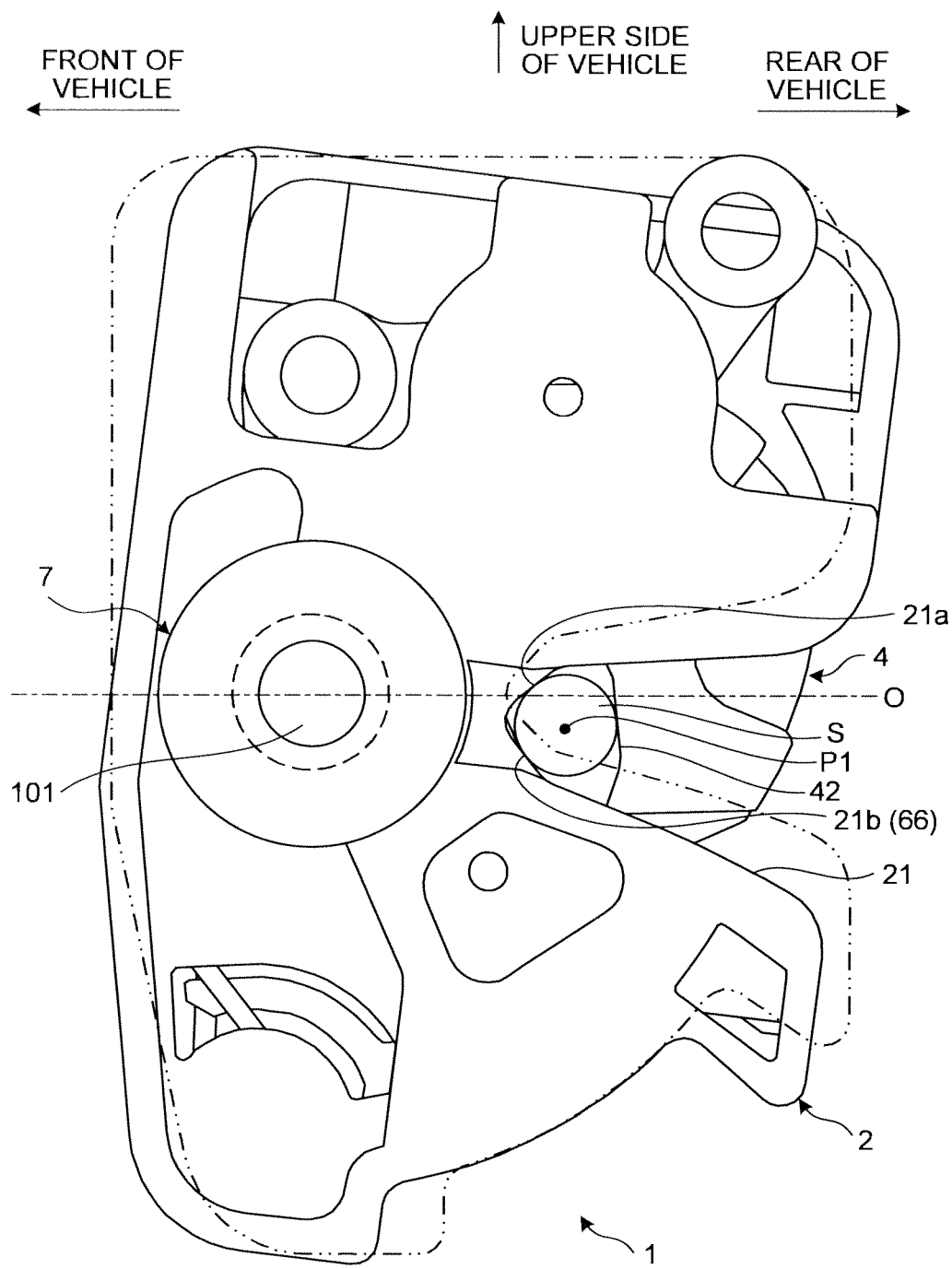
FIG. 10 is a plan view illustrating a state in which the lock device and the striker in the positional relationship in FIG. 9 are engaged with each other.

FIG. 8 is a sectional view illustrating a method of mounting the lock device according to the first embodiment to the frame. FIG. 9 is a plan view illustrating one example of a positional relationship between the lock device and the striker, when a mounting position of the striker is shifted. FIG. 10 is a plan view illustrating a state in which the lock device and the striker in the positional relationship in FIG. 9 are engaged with each other.

In the lock device 1 according to the first embodiment, the hook lever shaft 7 that pivotally supports the hook lever 4 is rotatably mounted to the body 2. The hook lever shaft 7 is inserted into the circular mounting hole 22 formed on the body 2, and rotates about a rotation shaft almost equal to the widthwise direction of the vehicle body. The hook lever shaft 7 in the first embodiment has the flange 73 on one end of the cylindrical portion 72 having the through-hole 71 extending in the direction of the rotation shaft of the rotation to the body 2. As illustrated in FIG. 8, in the lock device 1, the flange 73 of the hook lever shaft 7 is brought into contact with a frame (support member) 9 of the detachable seat, and a shaft 101 of a support bolt 10 is inserted into the through-hole 71 of the hook lever shaft 7 and a mounting hole 91 formed on the frame 9, whereby the lock device 1 is fastened and fixed by the support bolt 10 and a nut 11. Thus, the lock device 1 is rotatably mounted to the frame 9 with the lock mechanism housing member (the body 2 and the cover plate 3) being sandwiched between the flange 73 of the hook lever shaft 7 and a head 102 of the support bolt 10. Therefore, the rotation of the hook lever shaft 7 and the body 2 with respect to the frame 9 when being fastened can be prevented, and it is unnecessary to provide a member for preventing the body 2 from falling down from the hook lever shaft 7. Accordingly, the assembling operation of the lock device 1 is facilitated. When the lock device 1 (the body 2) is in the state of changing the opening position of the striker insertion groove 21, i.e., when the body 2 rotates within a predetermined angle, the lock device 1 is supported with the frame 9 with the striker insertion groove 21 being not closed by the frame 9.

When the lock device 1 according to the first embodiment is mounted to the frame 9 of the detachable seat, there may be a case in which a center position P1, when the striker S enters the striker insertion groove 21, becomes below a reference position O as illustrated in FIG. 9 due to the shift of the mounting position of the lock device 1 or the mounting position of the striker S.

In the lock device 1 according to the first embodiment, the hook lever shaft 7 rotatably mounted to the body 2 is fastened and fixed to the frame 9. Specifically, the body 2 (the lock device 1) is rotatably mounted to the frame 9 with the hook lever shaft 7 being defined as the rotation shaft. The body 2 is supported to the frame 9 in the state of changing the opening position of the striker insertion groove 21. Therefore, when the insertion position (center position P1) of the striker S is below the reference position O, as the body 2 rotates in the clockwise direction the hook lever 4 engages with the striker S as illustrated in FIG. 10. When the insertion position of the striker S is above the reference position O, as the body 2 rotates in the counterclockwise direction the hook lever 4 engages with the striker S. This case is not illustrated, though. The end (the other end) reverse to one end having the flange 73 of the cylindrical portion 72 of the hook lever shaft 7 is formed to have a length projecting from the opening of the cover plate 3 in the state in which the support bolt 10 is fastened to the frame 9. Therefore, the body 2 supported by the support bolt 10 can surely rotate.

In the lock device 1 according to the first embodiment, the flange 73 is present between the body 2 and the frame 9, so that the gap is formed when the lock device 1 is mounted to the frame 9, as illustrated in FIG. 8. Accordingly, the body 2 and the frame 9 do not contact each other during the rotation of the lock device 1. Consequently, the lock device according to the present invention has less factors, such as friction resistance, which inhibit the rotation of the lock device 1, thereby the lock device 1 smoothly rotates. As a result, even if the mounting position of the striker S or the lock device 1 is shifted, the lock device 1 according to the first embodiment can surely restrain the striker S with the body 2 and the hook lever 4. Specifically, if the lock device 1 according to the first embodiment is mounted to the detachable seat, the detachable seat can surely be fixed to the vehicle body.

In addition, the lock device 1 according to the first embodiment is fastened and fixed to the frame 9 by utilizing the through-hole 71 of the hook lever shaft 7 that pivotally supports the hook lever 4. With this structure, the lock device 1 (the body 2) can rotate with respect to the frame 9. Therefore, it is unnecessary in the lock device 1 according to the first embodiment that the mounting portion to the frame 9 is formed to project from the outer surface of the lock mechanism housing member (the body 2 and the cover plate 3) housing the lock mechanism such as the hook lever 4. Accordingly, the lock device 1 can surely make the engagement between the striker S and the hook lever 4 without an increase in size of the lock device 1, thereby being capable of surely restraining the striker S.

When the lock device 1 according to the first embodiment is mounted to the frame 9 by use of the support bolt 10 and the nut 11, a screw thread that can realize the threaded engagement between the hook lever shaft 7 and the support bolt 10 may be formed on an inner peripheral surface of the hook lever shaft 7 (the cylindrical portion 72). The rattle between the hook lever shaft 7 and the shaft 101 of the support bolt 10 can be prevented by the threaded engagement between the hook lever shaft 7 and the support bolt 10. Therefore, the generation of abnormal noise can be prevented.

As described above, in the lock device 1 according to the first embodiment, the cylindrical hook lever shaft 7 having the flange 73 on its one end is rotatably mounted to the body 2, and the hook lever shaft 7 pivotally supports the hook lever 4. Therefore, the lock device 1 can surely make the engagement between the striker S and the hook fever 4 without an increase in size of the lock device 1. Therefore, the lock device 1 according to the first embodiment can increase the flexibility of the mounting position upon mounting the lock device 1 to the detachable seat, and can surely fix the detachable seat to the vehicle body.

Figure 11:
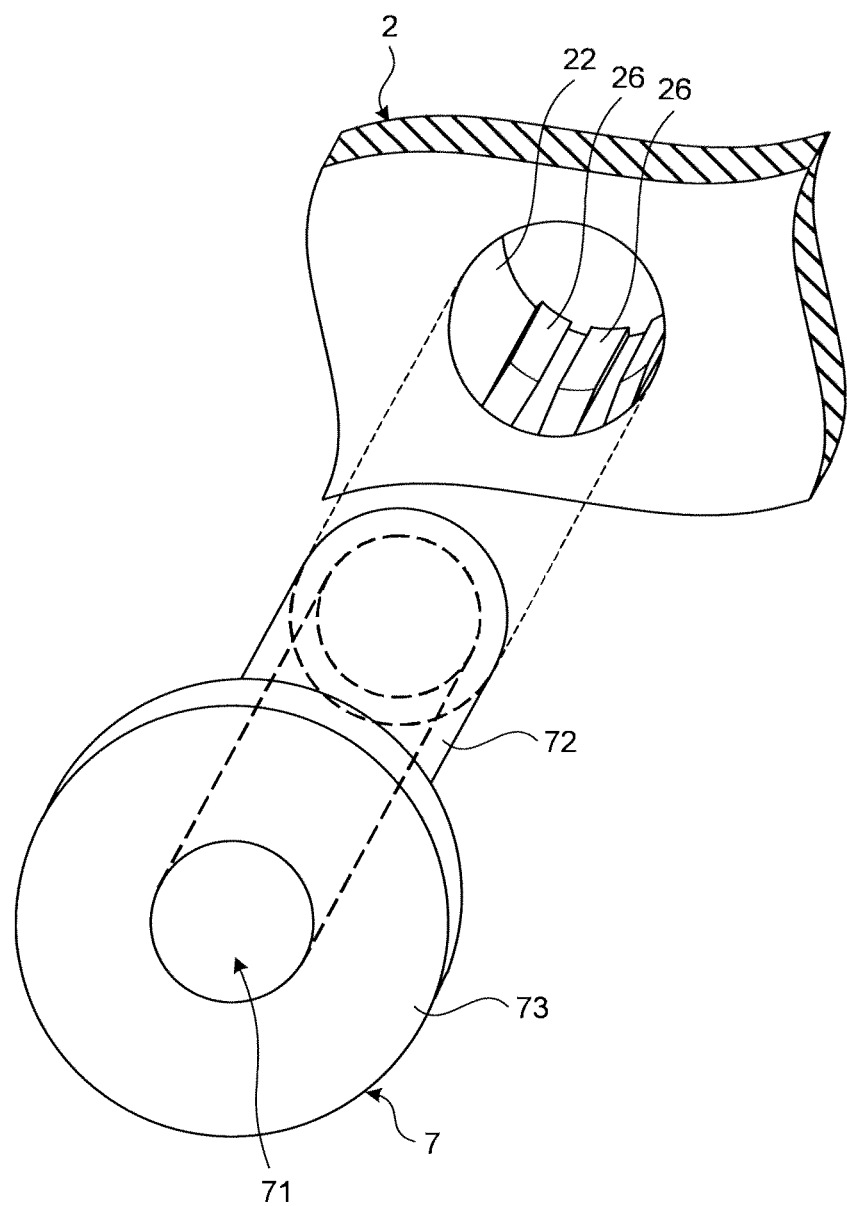
FIG. 11 is an exploded perspective view illustrating a preferable configuration of a method of mounting a hook lever shaft to a body in the lock device according to the first embodiment of the present invention.

FIG. 11 is an exploded perspective view illustrating a preferable configuration of a method of mounting the hook lever shaft to the body in the lock device according to the first embodiment.

The hook lever shaft 7 in the lock device according to the first embodiment is rotatably mounted to the body 2. When the gap is formed between the hook lever shaft 7 (the cylindrical portion 72) and the body 2 (the mounting hole 22), abnormal noise might be generated due to the rattle. Therefore, it is desirable that the hook lever shaft 7 is rotatably fitted to the mounting hole 22 in order not to cause the rattle between the body 2 and the hook lever shaft 7. In this case, it is preferable that a rib 26 extending in the insertion direction of the hook lever shaft 7 is formed on the inner peripheral surface of the mounting hole 22 on the body 2 as illustrated in FIG. 11, for example.

Figure 12:
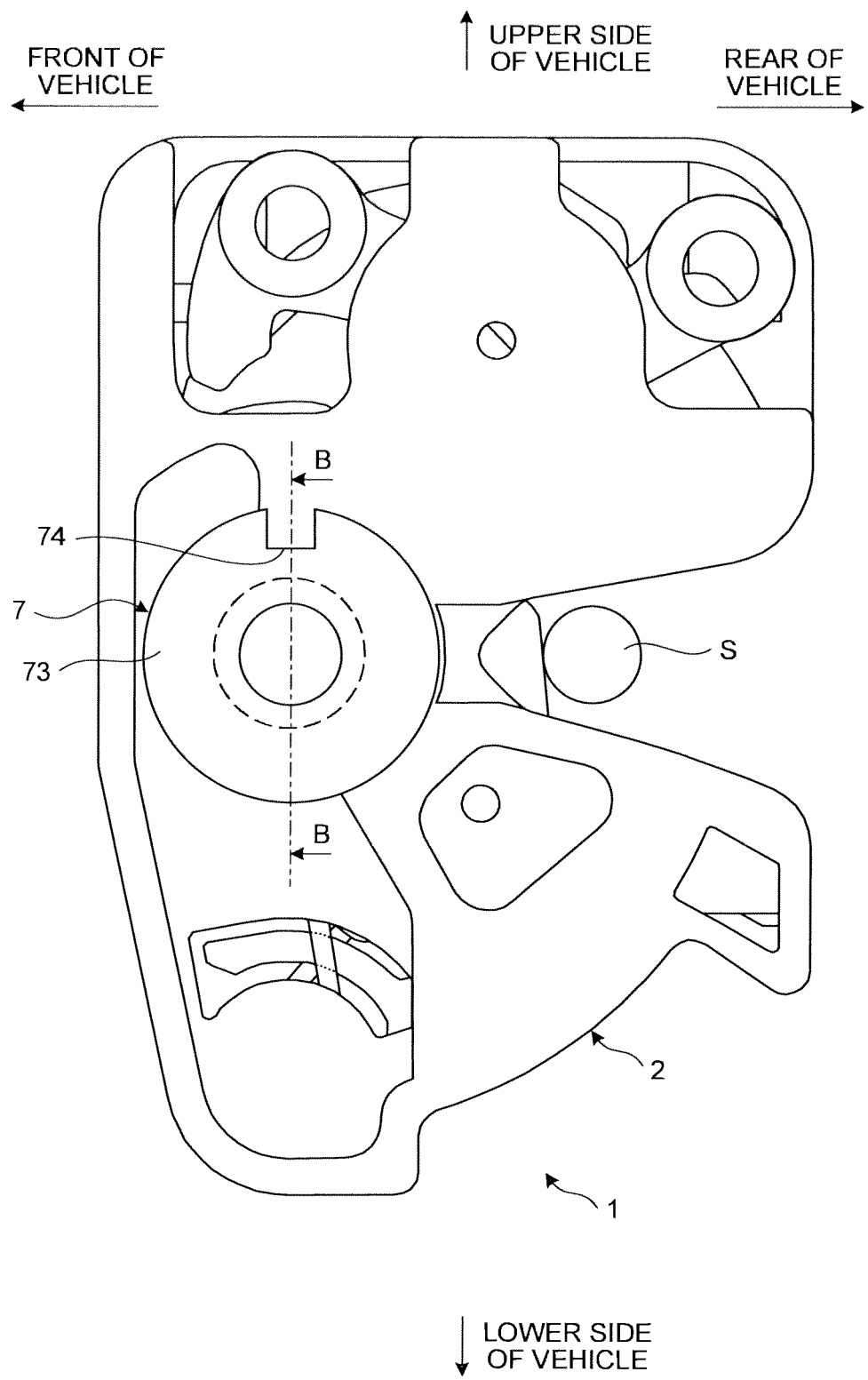
FIG. 12 is a plan view illustrating an exemplary modification of a hook lever shaft in the lock device according to the first embodiment of the present invention.
Figure 13:
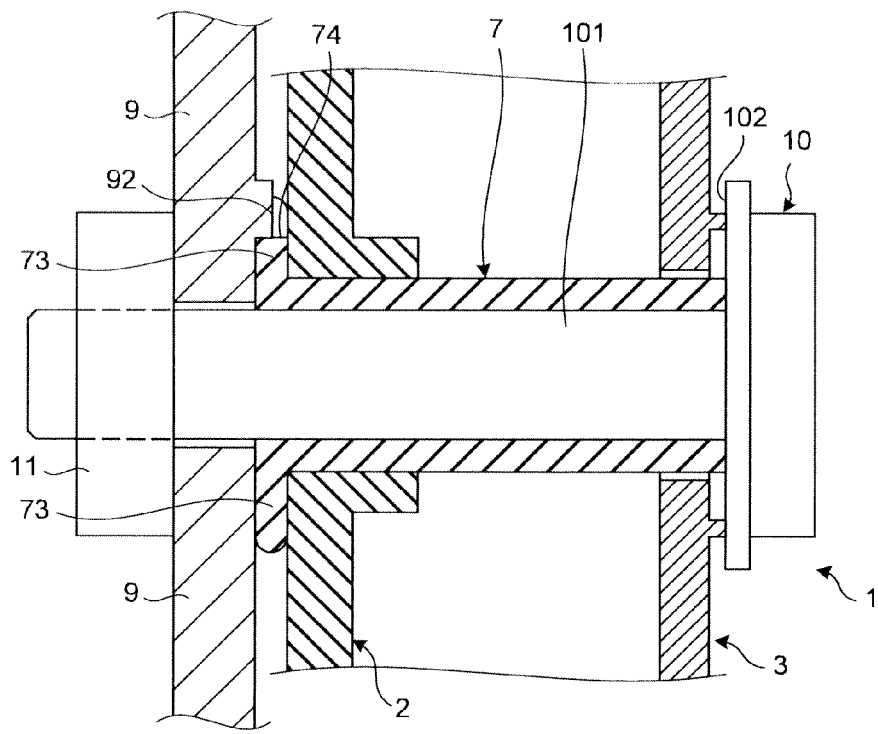
FIG. 13 is a sectional view taken along a line B-B in FIG. 12.

FIG. 12 is a plan view illustrating an exemplary modification of the hook lever shaft in the lock device according to the first embodiment. FIG. 13 is a sectional view taken along a line B-B in FIG. 12.

The flange 73 of the hook lever shaft 7 in the lock device 1 according to the first embodiment may have a cutout 74 on its outer periphery as illustrated in FIGS. 12 and 13. When the cutout 74 is formed on the flange 73 of the hook lever shaft 7, a projection 92 that engages with the cutout 74 is formed on the frame 9, for example, as illustrated in FIG. 13. This structure can prevent the hook lever shaft 7 and the body 2 from rotating with respect to the frame 9 when the support bolt 10 is fastened. Accordingly, the assembling operation of the lock device 1 is further facilitated. Any direction can be selected for forming the cutout 74 on the flange 73. In the case of the mounting direction illustrated in FIG. 12, the cutout 74 is preferably formed on an upper part or a lower part of the vehicle that is difficult to be affected by the direction of the load of the striker S.

Figure 14:
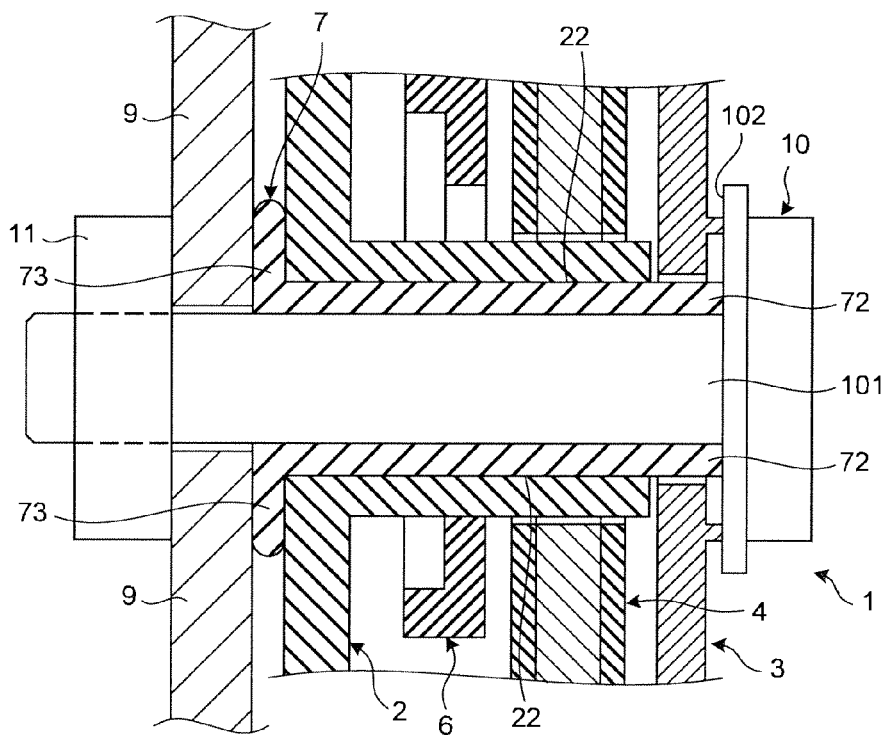
FIG. 14 is a sectional view illustrating an exemplary modification of a method of supporting a hook lever about a shaft in the lock device according to the first embodiment of the present invention.

FIG. 14 is a sectional view illustrating an exemplary modification of a method of pivotally supporting the hook lever in the lock device according to the first embodiment.

In the example of the lock device 1 according to the first embodiment illustrated in FIGS. 2 and 3, the hook lever 4 is pivotally supported with only the hook lever shaft 7. However, the hook lever 4 may be pivotally supported such that, for example, the mounting hole 22 on the body 2 cylindrically extends to the vicinity of the cover plate 3, and a cylindrical portion integral with the body 2 may be present between the hook lever shaft 7 and the hook lever 4 as illustrated in FIG. 14. When the hook lever 4 is pivotally supported with the hook lever shaft 7 made of a metal material in such a manner that the hook lever 4 can be in contact with the hook lever shaft 7, abnormal noise caused by a rattle may be generated. On the other hand, the abnormal noise caused by the rattle can be prevented by the structure in which the body 2 is made of a synthetic resin, and the cylindrical portion integral with the body 2 is present between the hook lever shaft 7 and the hook lever 4.

When the hook portion 43 is formed to have a tapered shape even in this case, the relative movement between the cylindrical portion of the body 2 and the hook lever 4 is not caused when the striker S is restrained on two points of the locking surfaces 21a and 21b of the striker insertion groove 21 and one point of the engagement surface 42, even if a gap is formed between the shaft hole 41 of the hook lever 4 and the cylindrical portion of the body 2. Therefore, even if the gap is formed between the shaft hole 41 of the hook lever 4 and the cylindrical portion of the body 2, the generation of abnormal noise caused by the rattle between the hook lever 4 and the cylindrical portion of the body 2 upon the restraint of the striker S can be prevented. In addition, the gap can be secured between the shaft hole 41 of the hook lever 4 and the cylindrical portion of the body 2, so that the insertion property of the hook lever 4 can be enhanced.

Second Embodiment

Figure 15:
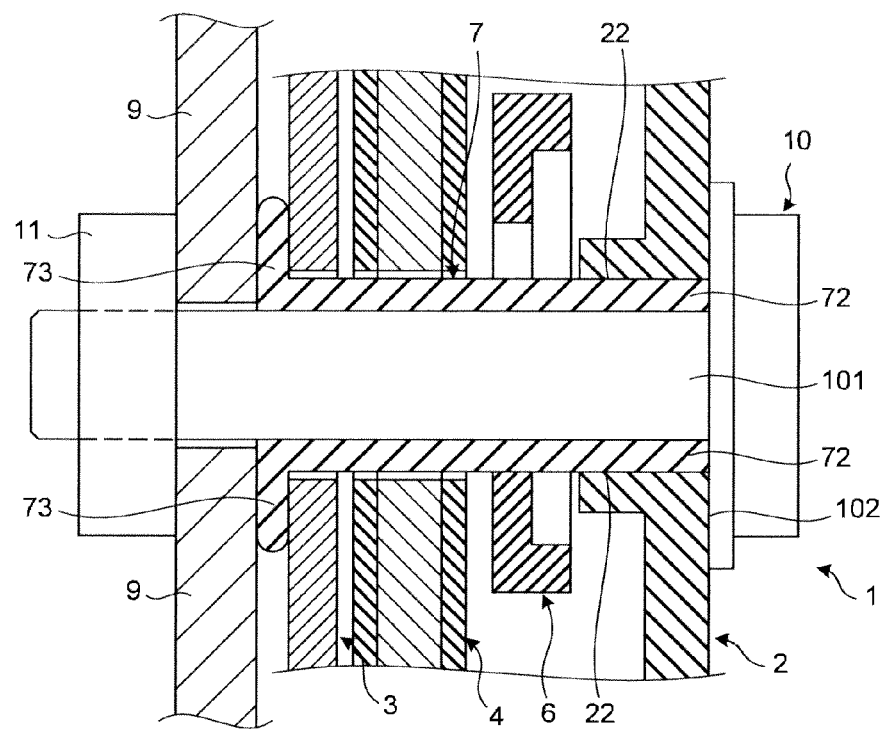
FIG. 15 is a sectional view illustrating a schematic configuration of a main portion of a lock device according to a second embodiment of the present invention.

FIG. 15 is a sectional view illustrating a schematic configuration of a main portion of a lock device according to a second embodiment of the present invention.

In the lock device 1 according to the first embodiment, the hook lever shaft 7 is inserted through the mounting hole 22 on the body 2 from the body 2 side for mounting the lock mechanism housing member including the body 2 and the cover plate 3 as illustrated in FIG. 3. On the other hand, in the lock device 1 according to the second embodiment, the hook lever shaft 7 is inserted into the mounting hole 22 of the body 2 from the cover plate 3 side for mounting the lock mechanism housing member including the body 2 and the cover plate 3 as illustrated in FIG. 15.

When the lock device 1 according to the second embodiment is mounted to the frame 9 in such a manner that the flange 73 on the hook lever shaft 7 is in contact with the frame 9 as illustrated in FIG. 15, a gap is formed between the cover plate 3 and the frame 9. Accordingly, as in the lock device 1 according to the second embodiment, the lock device 1 can surely make the engagement between the striker S and the hook lever 4 without an increase in size of the lock device 1, thereby being capable of surely restraining the striker S. Therefore, the lock device 1 according to the second embodiment can increase the flexibility of the mounting position upon mounting the lock device 1 to the detachable seat, and can surely fix the detachable seat to the vehicle body.

Figure 16:
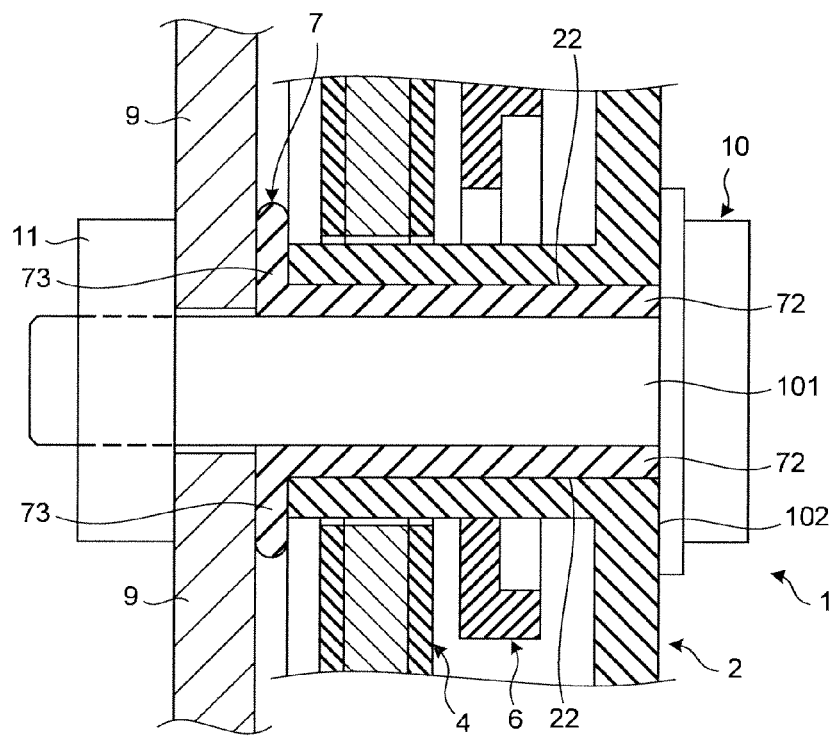
FIG. 16 is a sectional view illustrating an exemplary modification of the lock device according to the second embodiment of the present invention.

FIG. 16 is a sectional view illustrating an exemplary modification of the lock device according to the second embodiment of the present invention.

When the hook lever shaft 7 is inserted into the mounting hole 22 on the body 2 from the cover plate 3 side as in the lock device 1 according to the second embodiment, the lock device 1 is mounted to the frame 9 with the cover plate 3 side facing the frame 9.

The cover plate 3 is formed to cover the opening on the body 2, having almost the concave shape, in order to prevent foreign matters from getting into the lock mechanism housing member. Therefore, when the lock device 1 is mounted to the frame 9 with the cover plate 3, the opening on the body 2, facing the frame 9, the cover plate 3 can be eliminated as illustrated in FIG. 16, for example. When the cover plate 3 is not used, it is preferable that the body 2 is formed so as to have the cylindrical mounting hole 22 reaching the flange 73 on the hook lever shaft 7 in order to keep the distance from the bottom surface of the body 2 to the flange 73 as illustrated in FIG. 16. In this case, a cylindrical portion integral with the body 2 is interposed between the hook lever shaft 7 and the hook lever 4. With this structure, the abnormal noise due to the rattle can be prevented.

Third Embodiment

Figure 17:
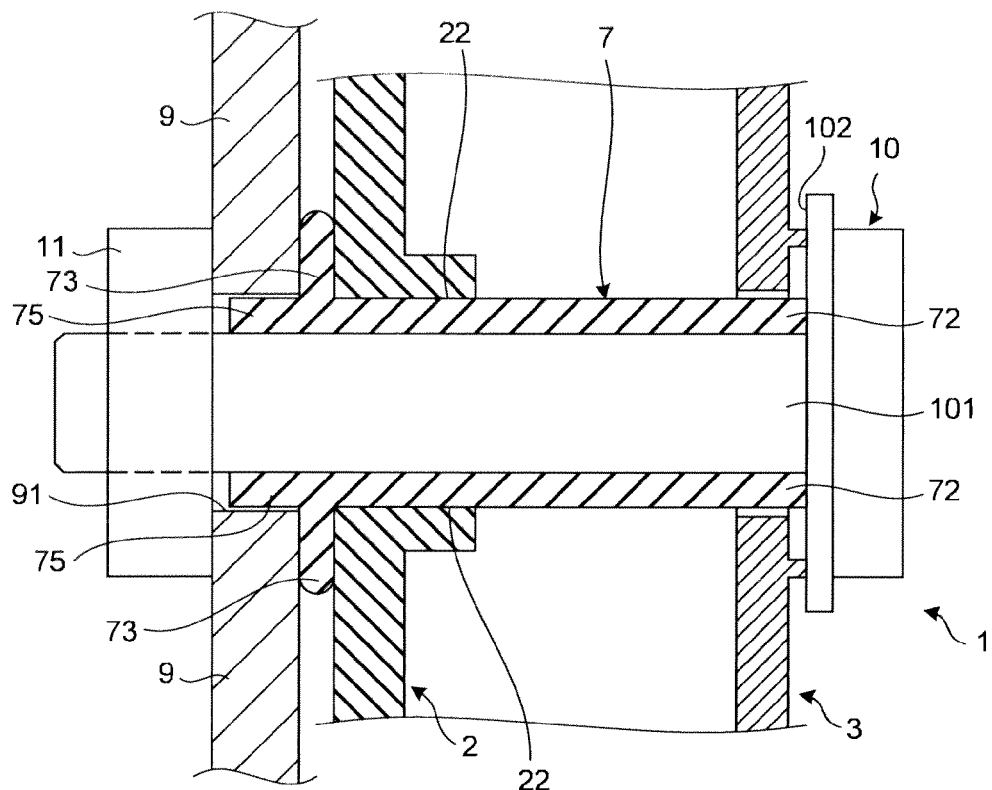
FIG. 17 is a sectional view illustrating a schematic configuration of a main portion of a lock device according to a third embodiment of the present invention.

FIG. 17 is a sectional view illustrating a schematic configuration of a main portion of a lock device according to a third embodiment of the present invention.

In the lock device 1 according to the first embodiment and the second embodiment of the present invention, the hook lever shaft 7 having the flange 73 on one end of the cylindrical portion 72 is used as illustrated in FIGS. 3 and 14. In contrast, in the lock device 1 according to the third embodiment, a hook lever shaft 7 having a projection 75 formed on the surface of the flange 73 opposite to the frame 9 is used as illustrated in FIG. 17. The projection 75 in FIG. 17 is cylindrically formed by extending the cylindrical portion 72, and the shaft 101 of the support bolt 10 can be inserted therein. When the projection 75 is formed on the flange 73, the mounting hole 91 formed on the frame 9 is formed to have a size to be capable of being engaged with or fitted to the projection 75.

When large force in the direction orthogonal to the longitudinal direction (the axial direction of the shaft 101 of the support bolt 10) of the hook lever shaft 7 is applied to the lock device 1 having no projection 75 on the flange 73 as in the lock device 1 according to the first embodiment and the second embodiment; a large shearing force is applied to the shaft 101 on the boundary between the portion of the shaft 101 of the support bolt 10 that is in contact with the flange 73 and the portion of the shaft 101 that is in contact with the frame 9. On the other hand, when the cylindrical projection 75 is formed on the flange 73 as in the lock device 1 according to the third embodiment, the effect obtained by the structure in which only the diameter of the portion of the shaft 101 that is in contact with the frame 9 is increased can be obtained without an increase in the diameter of the shaft 101 of the support bolt 10. This structure can prevent the shaft 101 from receiving large shearing force, when large force in the direction orthogonal to the longitudinal direction (the axial direction of the shaft 101 of the support bolt 10) of the hook lever shaft 7 is applied to the lock device 1. As a result, the shaft hole 41 of the hook lever 4 can be decreased thanks to the decrease in the diameter of the shaft 101 of the support bolt 10, whereby the lock device 1 can be downsized as a whole.

When the lock device 1 according to the third embodiment is mounted to the frame 9, the projection 75 on the flange 73 is engaged with or fitted to the mounting hole 91 on the frame 9, and with this state, the support bolt 10 is fastened. Therefore, this structure can prevent the positional deviation between the through-hole 71 of the hook lever shaft 7 and the mounting hole 91 of the frame 9 when the shaft 101 of the support bolt 10 is inserted, whereby the assembling operation of the lock device 1 is facilitated.

Figure 18:
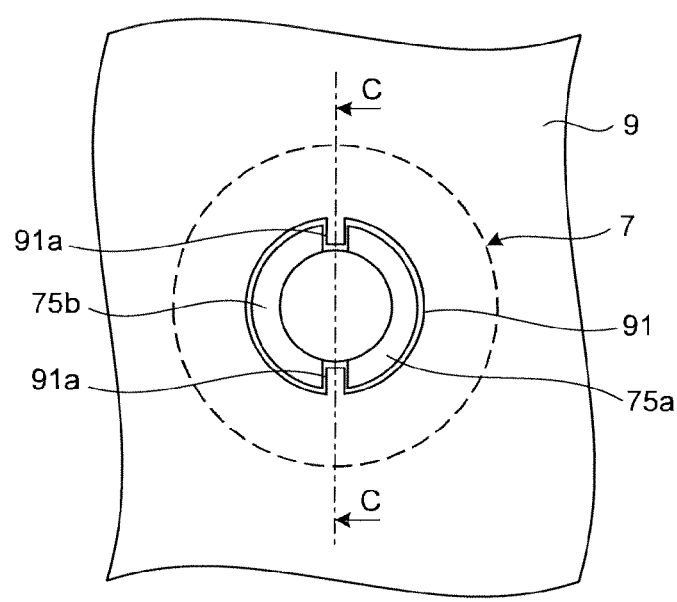
FIG. 18 is a plan view illustrating an exemplary modification of a hook lever shaft in the lock device according to the third embodiment of the present invention.
Figure 19:
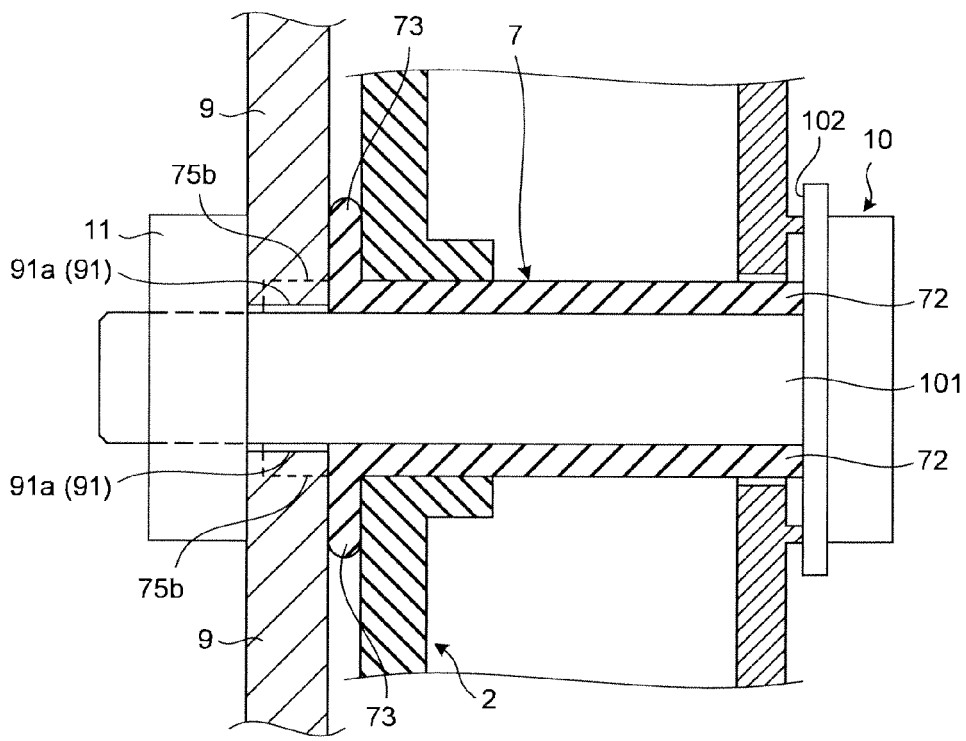
FIG. 19 is a sectional view taken along a line C-C in FIG. 18.

FIG. 18 is a plan view illustrating an exemplary modification of a hook lever shaft in the lock device according to the third embodiment. FIG. 19 is a sectional view taken along a line C-C in FIG. 18.

As illustrated in FIGS. 18 and 19, two partial cylindrical projections 75a and 75b, which are formed by dividing the cylinder on two positions, may be formed on the flange 73 of the hook lever shaft 7 in the lock device 1 according to the third embodiment. When the projections 75a and 75b are formed on the flange 73 of the hook lever shaft 7, an engagement portion 91a engageable with a groove that separates the projections 75a and 75b may be formed on the edge of the mounting hole 91 on the frame 9, for example. This structure can prevent the rotation of the hook lever shaft 7 and the body 2 with respect to the frame 9, when the support bolt 10 is fastened. Accordingly, the assembling operation of the lock device 1 is facilitated. The shape and number of the projections 75 formed on the flange 73 can be selected as appropriate. In the mounting direction as illustrated in FIGS. 1 and 12, it is preferable that the engagement portion 91a of the mounting hole 91 on the frame 9 is located on an upper part or a lower part of the vehicle that is difficult to be affected by the direction of the load of the striker S.

In the third embodiment, the hook lever shaft 7 is inserted into the mounting hole 22 of the body 2 from the body 2 toward the cover plate 3 as in the first embodiment. However, it is obvious that the hook lever shaft 7 in the third embodiment can be inserted into the mounting hole 22 on the body 2 from the cover plate 3 toward the body 2 as in the second embodiment.

Figure 20:
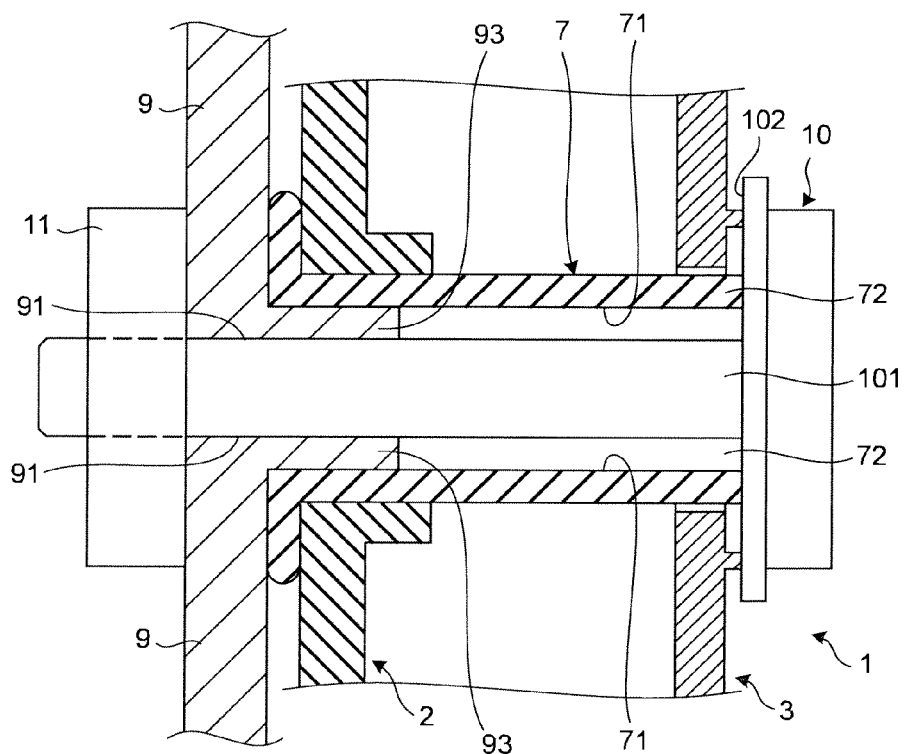
FIG. 20 is a sectional view illustrating a first exemplary modification of a method of fixing the hook lever shaft and the frame in the lock device according to the third embodiment of the present invention.

FIG. 20 is a sectional view illustrating a first exemplary modification of a method of fixing the hook lever shaft and the frame in the lock device according to the third embodiment.

The third embodiment shows the configuration in which the projection 75 is formed on the flange 73 of the hook lever shaft 7 in order that even the projection 75 can receive shearing force, as one example of the configuration of preventing the shaft 101 of the support bolt 10 from receiving large shearing force when the lock device 1 is mounted to the frame 9 by use of the support bolt 10. However, as illustrated in FIG. 20, a projection 93 may be formed on the surface of the frame 9 on which the lock device 1 is mounted in order to prevent the shaft 101 of the support bolt 10 from receiving large shearing force. The projection 93 on the frame 9 is cylindrically formed by extending the mounting hole 91 in the axial direction of the shaft 101 of the support bolt 10, and the shaft 101 of the support bolt 10 can be inserted therein. In the structure having the projection 93 formed on the frame 9, the projection 93 is engaged with or fitted to the hook lever shaft 7 (the cylindrical portion 72). In the configuration illustrated in FIG. 20, the frame 9 is in contact with the shaft 101 of the support bolt 10, and the hook lever shaft 7 is not in contact with the shaft 101. Since the projection 93 formed by extending the mounting hole 91 of the frame 9 is formed, the contact surface between the shaft 101 of the support bolt 10 and the frame 9 increases. This structure can prevent the shaft 101 from receiving large shearing force, when large force in the direction orthogonal to the longitudinal direction (the axial direction of the shaft 101 of the support bolt 10) of the hook lever shaft 7 is applied to the lock device 1.

In the structure having the projection 93 formed by extending the mounting hole 91 of the frame 9, a screw thread that enables the threaded engagement between the frame 9 and the support bolt 10 may be provided on the inner peripheral surface of the projection 93. By virtue of this structure, the lock device 1 can be mounted to the frame 9 without using the nut 11.

Figure 21:
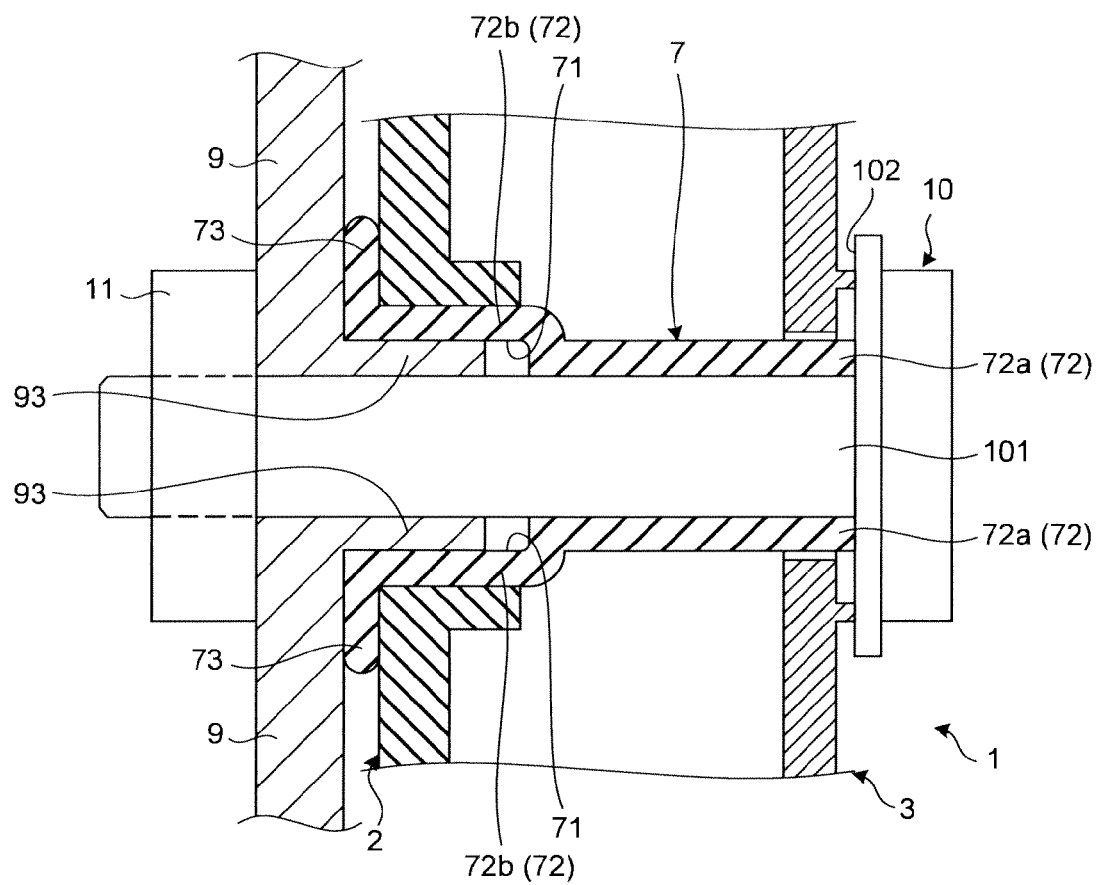
FIG. 21 is a sectional view illustrating a second exemplary modification of a method of fixing the hook lever shaft and the frame in the lock device according to the third embodiment of the present invention.

FIG. 21 is a sectional view illustrating a second exemplary modification of a method of fixing the hook lever shaft and the frame in the lock device according to the third embodiment.

In the exemplary modification of the lock device 1 according to the third embodiment illustrated in FIG. 20, the inner diameter of the hook lever shaft 7 (the cylindrical portion 72) is increased, or the shaft 101 of the support bolt 10 used for mounting the lock device 1 is made thin, in order to form the projection 93. However, when the inner diameter of the hook lever shaft 7 is increased, the shaft hole 41 of the hook lever 4 or the guide hole 62 of the guide lever 6 has to be increased, which increases the size of the lock device 1. On the other hand, when the shaft 101 of the support bolt 10 is made thin, the strength might be reduced.

Therefore, when the projection 93 is formed on the frame 9, the hook lever shaft 7 (the cylindrical portion 72) may be formed such that the size of the through-hole 71 of the hook lever shaft 7 is changed on the middle in the axial direction, and the diameter on the end near the frame 9 is larger than the diameter on the end apart from the frame 9, as illustrated in FIG. 21. In the configuration in FIG. 21, only a portion 72b that is one end of the hook lever shaft 7 on which the flange 73 is formed and on which the projection 93 is present is formed to be thicker than a portion 72a on the other end. Accordingly, it is unnecessary to increase the shaft hole 41 of the hook lever 4 or the guide hole 62 on the guide lever 6, and to make the shaft 101 of the support bolt 10 thin.

Even in the configuration illustrated in FIG. 21, a screw thread that enables the threaded engagement between the frame 9 and the support bolt 10 may be provided on the inner peripheral surface of the projection 93. With this structure, the lock device 1 can be mounted to the frame 9 without using the nut 11.

Fourth Embodiment

Figure 22:
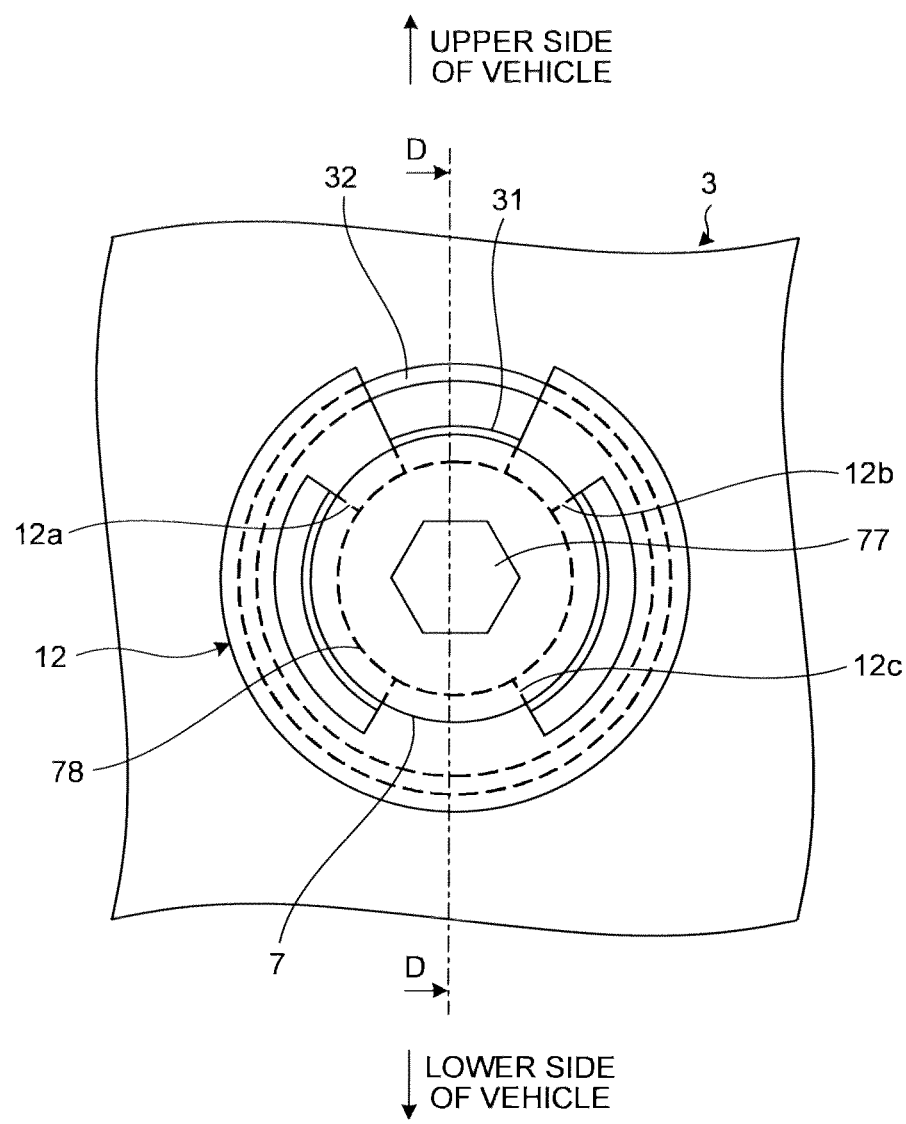
FIG. 22 is a plan view illustrating a schematic configuration of a main portion of a lock device according to a fourth embodiment of the present invention.
Figure 23:
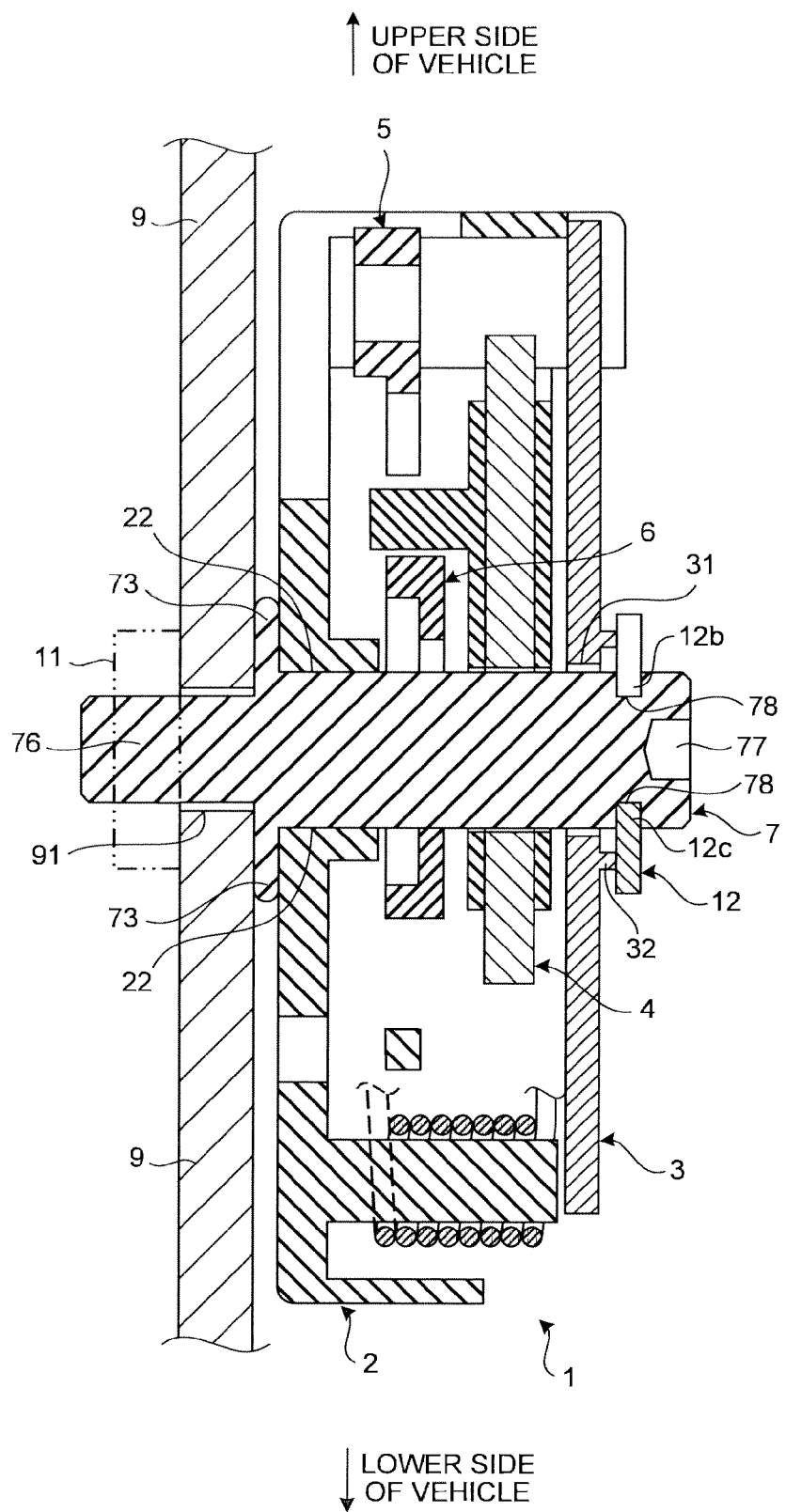
FIG. 23 is a sectional view of the whole lock device taken along a line D-D in FIG. 22.

FIG. 22 is a plan view illustrating a schematic configuration of a main portion of a lock device according to a fourth embodiment of the present invention. FIG. 23 is a sectional view of the whole lock device taken along a fine D-D in FIG. 22.

In the lock device 1 in the first to third embodiments, the shaft 101 of the support bolt 10 is inserted into the through-hole 71 formed on the hook lever shaft 7 for mounting the lock device 1 to the frame 9. On the other hand, in the lock device 1 according to the fourth embodiment, a bolt 76 is provided on the tip end of the flange 73 of the hook lever shaft 7, and the hook lever shaft 7 is fastened and fixed to the frame 9 by use of the bolt 76 and the nut 11, as illustrated in FIGS. 22 and 23.

In the fourth embodiment, the hook lever shaft 7 has a circular cylindrical shape on the side reverse to the bolt 76 making the flange 73 as a boundary, and an end projects from an opening 31 on the cover plate 3. A hexagon socket 77 used for fastening and a groove 78 for mounting a C-ring 12 are formed on the portion projecting from the opening 31 of the cover plate 3. As illustrated in FIG. 22, the C-ring 12 is an annular ring having substantially a C-shape as viewed in a plane, and formed with locking portions 12a, 12b, and 12c, which are engaged with the groove 78 on the hook lever shaft 7, on three positions on the inner periphery. The C-ring 12 mounted to the hook lever shaft 7 abuts against an annular projection 32 formed around the opening 31 of the cover plate 3 in the axial direction of the hook lever shaft 7. Thus, the lock device 1 is mounted to the frame 9 so as to be rotatable with the lock mechanism housing member (the body 2 and the cover plate 3) being sandwiched between the flange 73 of the hook lever shaft 7 and the C-ring 12. This structure can prevent the body 2 from falling from the hook lever shaft 7 upon the fastening, whereby the assembling operation of the lock device 1 is facilitated.

Since the annular projection 32 formed on the cover plate 3 is brought into abutment with the C-ring 12, the contact area between the cover plate 3 and the C-ring 12 can be reduced. Therefore, the lock mechanism housing member (body 2 and the cover plate 3) smoothly rotates. As a result, even if the mounting position of the striker S or the lock device 1 is shifted, the lock device 1 according to the fourth embodiment can surely restrain the striker S by means of the body 2 and the hook lever 4. Specifically, if the lock device 1 according to the fourth embodiment is mounted to the detachable seat, the detachable seat can surely be fixed to the vehicle body.

Fifth Embodiment

Figure 24:
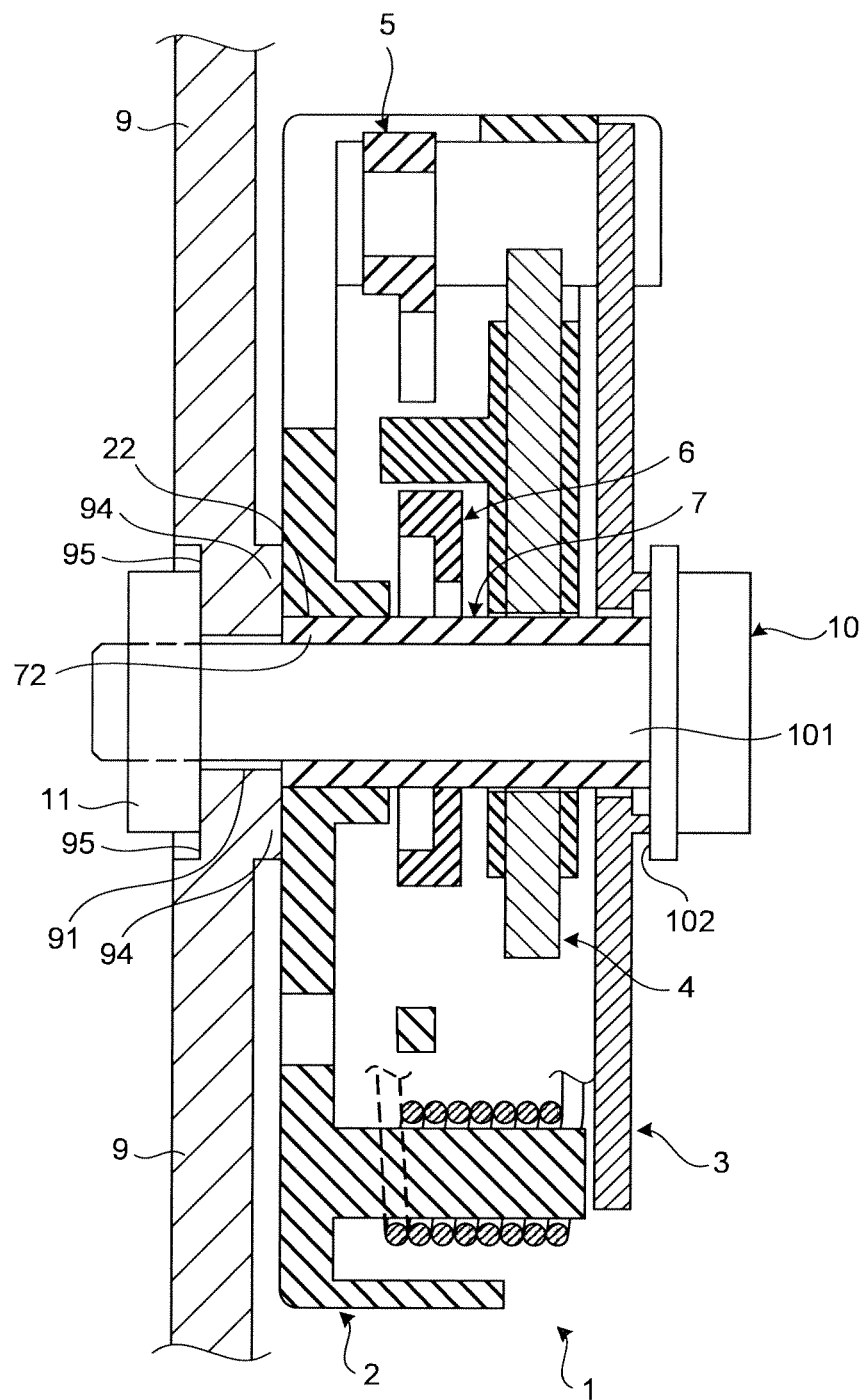
FIG. 24 is a sectional view illustrating a schematic configuration of a lock device according to a fifth embodiment of the present invention.

FIG. 24 is a sectional view illustrating a schematic configuration of a lock device according to a fifth embodiment of the present invention.

In the lock device 1 according to from the first to fourth embodiments, the gap is formed between the body 2 and the frame 9 by setting the flange 73 of the hook lever shaft 7 to be present between the body 2 and the frame 9. In contrast, in the lock device 1 according to the fifth embodiment, a flange 94 that abuts the body 2 at around the hook lever shaft 7 is formed on the frame 9, so as to form a predetermined gap between the body 2 and the frame 9, as illustrated in FIG. 24. The flange 94 is an annular projection formed along an edge of the mounting hole 91 of the frame 9, wherein the tip surface of the annular projection abuts the hook lever shaft 7 and the edge of the mounting hole 22 on the body 2. The flange 94 is formed by a press work, for example. When the flange 94 is formed by the press work, a concave 95 corresponding to the flange 94 is generated on the surface of the frame 9 opposite to the lock device 1.

In the lock device 1 according to the fifth embodiment, the lock mechanism housing member (the body 2 and the cover plate 3) is rotatably mounted to the frame 9 in a state being sandwiched between the flange 94 of the frame 9 and the head 102 of the support bolt 10. Therefore, the rotation of the body 2 with respect to the frame 9, in the process of fastening, can be prevented, and it unnecessary to provide a member for preventing body 2 from falling from the hook lever shaft 7. Accordingly, the assembling operation of the lock device 1 is facilitated. When the lock device 1 is mounted to the frame 9, a gap is formed between the body 2 and the frame 9, so that the contact surface between the body 2 and the frame 9 is reduced. Accordingly, likewise the lock device 1 according to the other embodiments, the lock device 1 according to the fifth embodiment can reduce friction resistance between the body 2 and the frame 9 upon the rotation of the body 2, whereby the body 2 can surely rotate. As a result, even if the mounting position of the striker S or the lock device 1 is shifted, the lock device 1 according to the fifth embodiment can surely restrain the striker S with the body 2 and the hook lever 4.

The embodiments of the lock device according to the present invention have been described above. The present invention is not limited to the configurations described in the above-mentioned embodiments, and various modifications are possible without departing from the scope of the present invention.

For example, the support member supporting the lock device 1 so as to be rotatable is not limited to the frame 9 on the backrest of the detachable seat. The support member may be a frame of a seating portion of the detachable seat. The lock device 1 according to the present invention may be mounted not only to the detachable seat but also to a movable seat. The lock device 1 according to the present invention may also be mounted to a vehicle body. When the lock device 1 according to the present invention is mounted to the vehicle body, the support member rotatably supporting the lock device 1 is not limited to the frame of the vehicle body, but may be a floor member. When the lock device 1 according to the present invention is mounted to the vehicle body, it is obvious that the striker S is provided to the detachable seat or the movable seat.

The configuration of the lock device 1 (lock mechanism) is not limited to that described in the first embodiment, and various modifications are naturally possible.

In the lock device according to the present invention, the body provided with the hook lever is rotatably supported by the support member through the hook lever shaft, and the position of the opening of the striker insertion groove is changed by the rotation of the body. Therefore, the lock device according to the present invention does not have to be provided with the mounting portion for rotatably mounting the body to the support member on the outer surface of the body. Consequently, the present invention can prevent the increase in size of the lock device.

In addition, in the lock device according to the present invention, the body is rotatably supported with a predetermined gap being formed between the body and the support member by the projection such as a flange formed on the hook lever shaft or the projection of the support member. Therefore, the lock device according to the present invention can reduce causes that inhibit the rotation of the body, such as the friction resistance between the body and the support member. Specifically, in the lock device according to the present invention, even if the mounting position of the striker or the lock device is shifted, the body smoothly rotates according to the shift amount, and the striker enters the inward part of the striker insertion groove. This structure results in a secure engagement between the striker and the hook lever, whereby the striker can surely be restrained by the body (striker insertion groove) and the hook lever. Accordingly, when the lock device according to the present invention is mounted to the support member such as the frame of the detachable seat, the detachable seat can surely be fixed to the vehicle body.

Although the invention has been described with respect to specific embodiments for a complete and clear disclosure, the appended claims are not to be thus limited but are to be construed as embodying all modifications and alternative constructions that may occur to one skilled in the art that fairly fail within the basic teaching herein set forth.

What is claimed is:

1. A lock device comprising:
a hook lever shaft;
a body having a striker insertion groove into which a striker is inserted, the body being rotatably mounted to the hook lever shaft; and
a hook lever, wherein
the body is made of a synthetic resin, and has a cylindrical portion present between the hook lever shaft and the hook lever,
the hook lever is rotatably mounted to the body via the cylindrical portion such that the hook lever is rotatable about the cylindrical portion between an engagement position, where the hook lever is engaged with the striker inserted into the striker insertion groove, and a release position, where engagement with the striker is released, the body is supported by a support member so as to change an opening position of the striker insertion groove, the hook lever shaft has a flange provided on one end thereof in an axial direction, the flange being interposed between the body and the support member so as to form a gap between the body and the support member, and the body is supported by the support member so as to rotate about the hook lever shaft and change the opening position of the striker insertion groove, and the hook lever has a hook portion configured to prevent the striker from being released from the hook lever when the hook lever is in the engagement position.

2. The lock device according to claim 1, wherein the hook lever shaft is cylindrical in shape and has a through-hole on its center into which a fastening unit is inserted, and the hook lever shaft is fastened and fixed to the support member by the fastening unit so that the body is supported by the support member.

3. The lock device according to claim 2, wherein the fastening unit is a support bolt, and the hook lever shaft has a screw thread configured to be threadably engaged with the support bolt.

4. The lock device according to claim 1, wherein the hook lever shaft has a bolt on the one end in the axial direction, and is supported to the support member by fastening and fixing the hook lever shaft to the support member with the bolt.

* * * * *